United States Patent [19]
Haartsen

[11] Patent Number: 6,044,268
[45] Date of Patent: Mar. 28, 2000

[54] SYSTEM AND METHOD FOR PROVIDING INTERCOM AND MULTIPLE VOICE CHANNELS IN A PRIVATE TELEPHONE SYSTEM

[75] Inventor: Jacobus C. Haartsen, Staffanstorp, Sweden

[73] Assignee: Telefonaktiebolaget LM Ericsson AB, Stockholm, Sweden

[21] Appl. No.: 08/895,138

[22] Filed: Jul. 16, 1997

[51] Int. Cl.[7] ................................................. H04M 11/00
[52] U.S. Cl. ........................... 455/426; 455/464; 455/436
[58] Field of Search .................................. 455/411, 426, 455/436, 437, 438, 447, 462, 464

[56] References Cited

U.S. PATENT DOCUMENTS

| 4,131,849 | 12/1978 | Freeburg et al. | 325/54 |
|---|---|---|---|
| 4,630,257 | 12/1986 | White | 370/29 |
| 5,040,175 | 8/1991 | Tuch et al. | 370/85.2 |
| 5,119,375 | 6/1992 | Paneth et al. | 370/95.1 |
| 5,247,567 | 9/1993 | Hirano | 379/61 |
| 5,375,140 | 12/1994 | Bustamante et al. | 375/1 |
| 5,392,330 | 2/1995 | Paniccia, Jr. | 379/61 |
| 5,400,327 | 3/1995 | Dezonno | 370/62 |
| 5,513,248 | 4/1996 | Evans et al. | 455/411 |
| 5,539,730 | 7/1996 | Dent | 370/29 |
| 5,555,258 | 9/1996 | Snelling et al. | 370/29 |
| 5,572,575 | 11/1996 | Yamamoto et al. | 379/61 |

FOREIGN PATENT DOCUMENTS

| 0 506 637 A2 | 3/1992 | European Pat. Off. . |
| 0 611 006 A1 | 2/1994 | European Pat. Off. . |
| WO 97/09835 | 3/1997 | WIPO . |

Primary Examiner—David R. Hudspeth
Assistant Examiner—Daniel Abebe
Attorney, Agent, or Firm—Jenkens & Gilchrist

[57] ABSTRACT

A system and method for allowing intercom and multiple voice channel communication within a private telephone system employing a private base station and a multiplicity of standard cellular terminals is disclosed. Full duplex intercom communications between two users within the private telephone system may be facilitated by use of two half-rate channels, one channel transceiver on even-numbered TDMA transmission frames and another channel transceiver on odd-numbered transmission frames, both from respective terminals to a private base station, which mediates the communication therebetween. Multiple voice channels are also provided within the private telephone system, allowing two users on two separate channels to communicate with respective remote wireline users simultaneously.

53 Claims, 14 Drawing Sheets

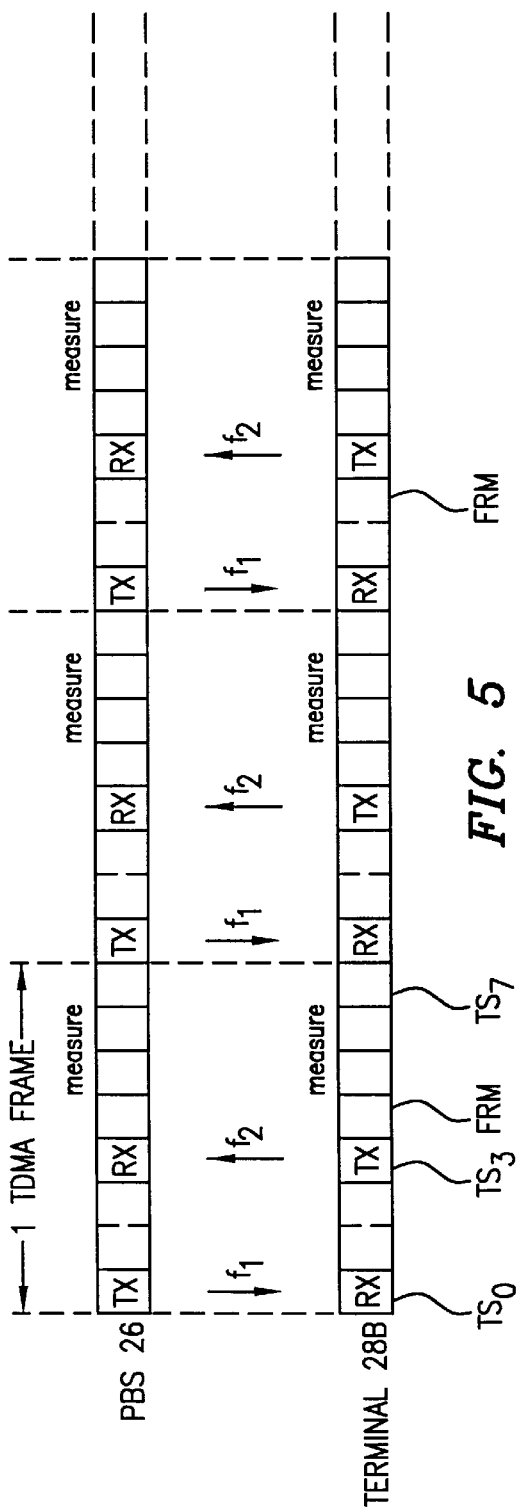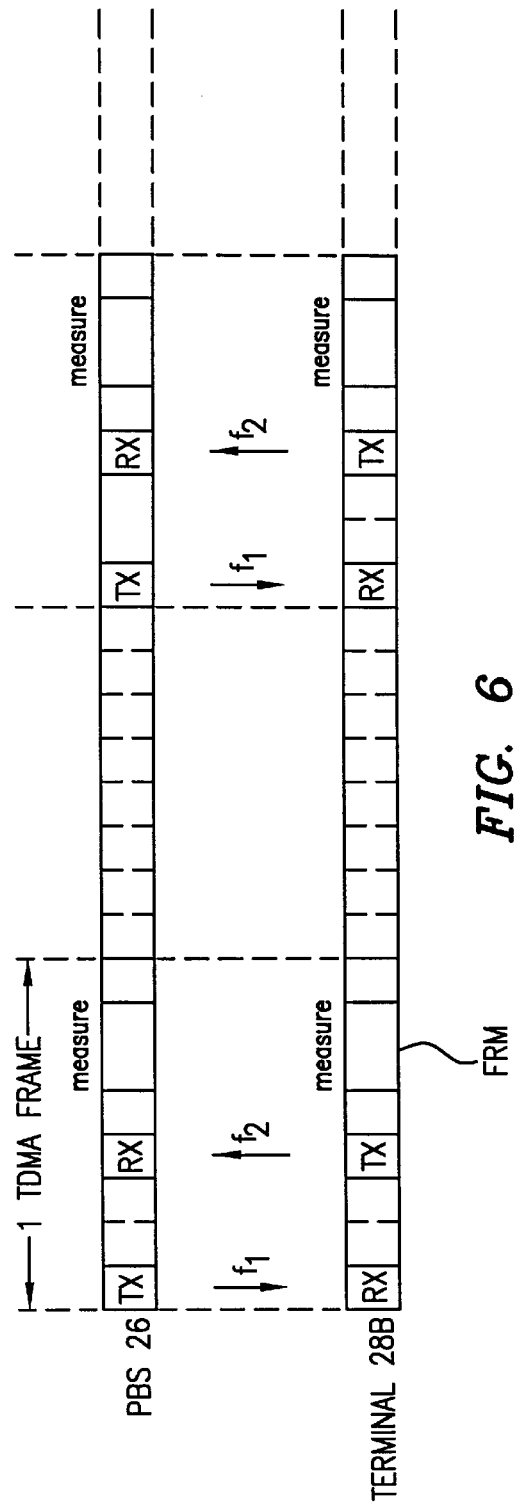

SYSTEM AND METHOD FOR PROVIDING INTERCOM AND MULTIPLE VOICE CHANNELS IN A PRIVATE TELEPHONE SYSTEM

BACKGROUND OF THE PRESENT INVENTION

1. Field of the Invention

The present invention relates to communications within a private telephone system, particularly, to communications between a multiplicity of users via a private base station, and, more particularly, to an improved system and method for intercom communications between users within the private telephone system and for multiple voice communications between users within the private telephone system and remote users outside the private telephone system.

2. Background and Objects of the Invention

The past two decades have seen a considerable rise in the deployment of mobile telephony across the globe. As noted in U.S. Pat. No. 5,555,258, however, mobile telephony was preceded by cordless telephony, a low-power, low-range ancestor used primarily in the residential context and enabling an individual to move around a house or apartment and still place and receive calls. As shown in FIG. 1, a conventional cordless telephone system, designated generally by the reference numeral 10, includes a private or home base station 12 and a plurality of portable or cordless phones 14, e.g., cordless phones 14A and 14B, which are coupled to the private base station 12 through radio frequency (rf) signals. The private base station 12 is hardwired to a Public Switched Telephone Network (PSTN) 16, whereby a cordless phone user, e.g., at phone 14A, may access and communicate with a remote user across the PSTN 16, e.g., to a standard phone 18 or a mobile or cellular phone 20 through a cellular base station 22, as is understood in the art.

The aforementioned private base station 12 and cordless phones 14A and 14B associated therewith have typically constituted a stand-alone consumer product which, while the phones 14 remain within the short transmission range of such systems 10, behaves like a regular telephone, e.g., phone 18, through the rf link with the private base station 12. The cordless phones 14A and 14B, however, could not also function as a cellular phone, e.g., mobile phone 20, when outside the range of the system 10. Recently, however, cordless phone technology has become more versatile, particularly with private base stations 12 providing cordless services to conventional cellular phones, such as mobile phone 20, also. To accomplish this feat, these digital cordless phone systems utilize an air interface that is in large extent compatible with a standard digital cellular air interface, e.g., the European Groupe Speciale Mobile (GSM) or the Digital Advanced Mobile Phone System (D-AMPS) communications standards.

With reference now to FIG. 2, there is shown a private telephone system, designated generally by the reference numeral 24, used in the system and method of the present invention, which includes a private or home base station (PBS) 26 and a multiplicity of cellular or cellular-compatible phones or terminals, e.g., terminals 28A and 28B, which function as cordless phones when within the proximity of the private base station 26 and which preferably also have an air interface compatible with one of the aforementioned standards, e.g., GSM. Accordingly, the system 24 configuration enables the conventional cellular phones, e.g., terminals 28A and 28B, to connect with the home base station 26 without the need for hardware modifications to the terminals 28A and 28B. Cellular and cordless functionality are instead implemented via software control.

An example of such a digital cordless air interface based on a digital cellular air interface has been described in a recent patent application of the assignee, U.S. patent applicant Ser. No. 08/704,901, of which the present inventor is the inventor thereof, entitled "Method and Apparatus for Adapting Non-Cellular Private Radio Systems to be Compatible with Cellular Mobile Phones," filed Aug. 30, 1996. In this way, an ordinary cellular phone, e.g., terminals 28A or 28B in FIG. 2, can be used either in the cellular mode or in the cordless mode when within the range of the private base station 26, thereby obviating the need for a purely cordless terminal such as the terminals or phones 14A and 14B in FIG. 1.

An obvious advantage of this arrangement is that the private telephone system 24 can reuse most of the hardware utilized in the cellular terminals 28A and 28B. In particular, the same baseband and Intermediate Frequency (IF) radio processing circuits can be reused, as is understood in the art. Reuse of terminal hardware within the private telephone system 24 is also very attractive from a cost point of view since the private base station 26 benefits from the volume production of today's cellular terminals.

Shown in FIG. 3 is a high-level block diagram of various transceiver components (generally designated by the reference numeral 29) within a conventional mobile terminal such as terminals 28A or 28B. As is well understood in the art, four primary transceiving component blocks may be identified therein: a radio block 90, a baseband logic block 92, a control logic block 94 and an audio interface block 96. Within radio block 90, the receive and transmit information is converted from and to rf frequencies, and filtering using baseband or IF circuitry is applied, as is understood in the art. In the baseband logic block 92, basic signal processing occurs, e.g., synchronization, channel coding, decoding and burst formatting, as is understood in the art. Audio interface block 96 handles voice as well as Analog-to-Digital (A/D) and D/A processing. Control logic block 94, via microprocessor control (not shown), coordinates the aforedescribed blocks 90, 92 and 96 and also plays an important role in the Man-Machine Interface (MMI). The functionality of the aforedescribed transceiving blocks will be described in more detail hereinafter, in particular in connection with FIG. 10 and the associated text.

Shown in FIG. 4 is a similar high-level block diagram of transceiving components (generally designated by the reference numeral 30) within the private base station 26. As with the transceiver 29 components of mobile terminal 28 in FIG. 3, four primary transceiving components of the private base station 26 are illustrated in FIG. 4: a PBS radio block 100, a PBS baseband logic block 102, a PBS control logic block 104 and a wireline interface block 106. The PBS radio block 100 is similar to the radio block 90 within the mobile terminal 28, the difference being that the transmission frequency in the terminal 28 must be used for reception in the PBS 26, and vice versa. The IF and DC processing are identical. It should be understood that the baseband logic blocks 92 and 102 in FIGS. 3 and 4, respectively, may be identical. Wireline interface block 106 provides the conversion between standard PSTN 16 or Integrated Service Digital Network (ISDN) signals and the signals for transmission over the air interface. Lastly, PBS control logic block 104, also via microprocessor control, schedules the various processes regarding blocks 100, 102 and 106. It should be understood that, since the respective control logic blocks 94 and 104 constitute microprocessor control, the only modification from standard equipment required is reconfiguration of the aforementioned microprocessors, which does not typically entail any hardware changes.

In accordance with the above description, a simple private base station 26 for cordless communication can readily be implemented with mobile station-based hardware. Thus configured, the private base station 26, through transceiver 30, would support one traffic channel to connect to a single phone, e.g., terminal 28A or 28B. Despite the increased communications functionality, however, this configuration is unable to readily support more advanced telephone features like intercom or multiple voice channels. In an intercom system, for example, one terminal, e.g., cellular terminal 28A, communicates with another terminal within the system 24, e.g., cellular terminal 28B, also connected to the private base station 26. However, in the configuration shown in FIG. 2, since terminals 28A and 28B cannot communicate directly with one another (the terminals cannot hear each other because they both transmit in the TX band, in which they cannot receive, and both receive in the RX band, in which they cannot transmit), intercom functionality may only be implemented indirectly, i.e., by using the private base station 26 as a relay unit. In this manner, the private base station 26, which has an rf link to both terminals 28A and 28B, relays information back and forth between the two terminals.

Current terminal technology, however, supports only one full rate channel on each terminal, i.e., an uplink slot and a downlink slot in Time Division Multiple Access (TDMA) technology, such as applied in GSM and D-AMPS, as is understood in the art. Accordingly, using current terminal technology with only a single radio transceiver to implement the private base station 26, only one channel is allowed in a private telephone system, such as the system 24 configuration shown in FIG. 2, i.e., the private base station 26 therein can only communicate across a single channel regardless of the number of users, i.e., terminals, in the system 24. Thus, intercom and simultaneous multiple voice channels are currently not possible when utilizing (or reusing) conventional terminal technology in a private base station, such as the private base station 26 in FIG. 2.

It would, however, be possible to implement the aforementioned intercom and multiple voice channel functionality in the telephone system 24 of FIG. 2 if the private base station 26 is based on (advanced) terminal technology that can handle multiple channels (multiple time slots and/or multiple carrier frequencies). However, such terminals, at present, do not exist. Additionally, basic multi-slot channels as currently being envisioned for cellular terminals typically require that all timeslots constituting a channel use the same carrier frequency therein. The reason for this frequency restriction is that synthesizers, described further hereinafter, utilized in the terminals and used for the upconversion and downconverssion of signals are not agile enough to switch frequencies from one time slot to the next time slot, necessitating the frequency limitation. This restriction, however, has been solved by using the same carrier frequency on consecutive time slots, thereby facilitating the implementation of a multi-slot channel in a cellular terminal such as terminal 28A or 28B.

Even with this advancement, however, the utilization of such multi-channel technology in a private telephone or cordless system, e.g., system 24 described herein in connection with FIG. 2, for intercom and multiple channel usages limits the performance of the private telephone system. One such performance limitation is due to interference. For example, the aforedescribed private telephone systems 24, which typically operate within a broader overlaying cellular system, may share frequencies therewith because there is no coordination of frequency allocation between the disparate systems. Accordingly, frequency interference between the private "cordless" system 24 and the overlaying cellular system, as well as interference between overlapping private cordless systems 24, is present and has to be prevented, e.g., by adaptive channel allocation techniques applied autonomously in each private cordless system 24.

Such an adaptive channel allocation scheme has been described in a recent patent application of the assignee, U.S. patent application Ser. No. 08/704,846 of which the present inventor is the inventor thereof, entitled "Method and System for Autonomously Allocating a Cellular Communications Channel for Communication Between a Cellular Terminal and a Telephone Base Station," filed Aug. 28, 1996. As discussed in said co-pending application, when establishing a TDMA link, the private system 24 should select a time slot on a carrier frequency which is not already occupied by an overlaying cellular system or overlapping another private cordless system 24. As will be understood to those skilled in the art, applying the multi-slot technology for multiple channels will severely restrict the adaptive channel allocation selection algorithm since the multi-slot concept requires adjacent time slots to be on the same carrier frequency. Therefore, the aforementioned adaptive channel allocation algorithm has to find a carrier with a non-occupied time interval sufficiently large to accommodate the time slots required in the considered private system 24.

Accordingly, there is a need for a private telephone system allowing intercom and multiple voice channel communication capabilities with minimal interference to and from other systems.

It is, accordingly, an object of the present invention to provide intercom and multiple voice channel capabilities within a private telephone system.

It is also an object of the present invention to provide such capabilities with a minimal amount of interference from an overlaying cellular system or any other private telephone systems nearby.

It is a further object of the present invention that the private telephone system utilizes a private base station with a single radio transceiver, both the station and the transceiver being based upon existing terminal technology.

SUMMARY OF THE INVENTION

The present invention is directed to a system and method allowing intercom and multiple voice channel communication within a private cordless telephone system having a private base station and a multiplicity of standard cellular terminals in communication therewith. Full duplex intercom communications between two cellular terminals within the private telephone system may be facilitated by use of two half-rate channels, one channel on even-numbered TDMA transmission frames and another channel on odd-numbered transmission frames, both from respective portable phones to a private base station, which mediates the communication therebetween. Multiple voice channels are also provided within the private telephone system, allowing the two portable phones on the two channels to separately and simultaneously communicate with remote users on alternate TDMA transmission frames.

A more complete appreciation of the present invention and the scope thereof can be obtained from the accompanying drawings which are briefly summarized below, the

BRIEF DESCRIPTION OF THE DRAWINGS

FIG. 5 is a block diagram illustrating the transmission frame structure of speech and other transmission data within the private telephone system of FIG. 2 at a full rate;

FIG. 6 is a block diagram illustrating the transmission frame structure of speech and other transmission data within the private telephone system of FIG. 2 at half rate;

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
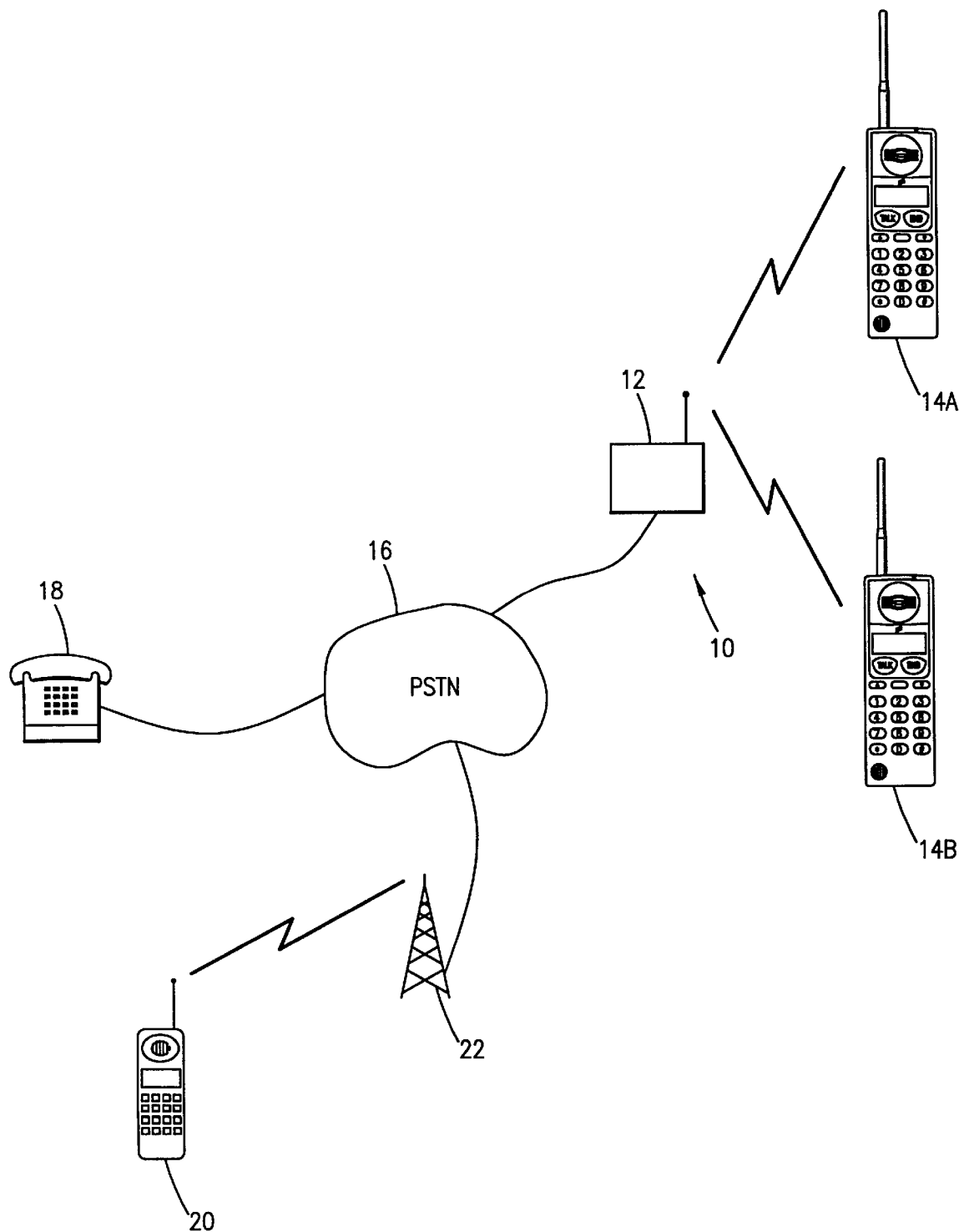
FIG. 1 is a schematic diagram of a conventional private cordless telephone system.
Figure 2:
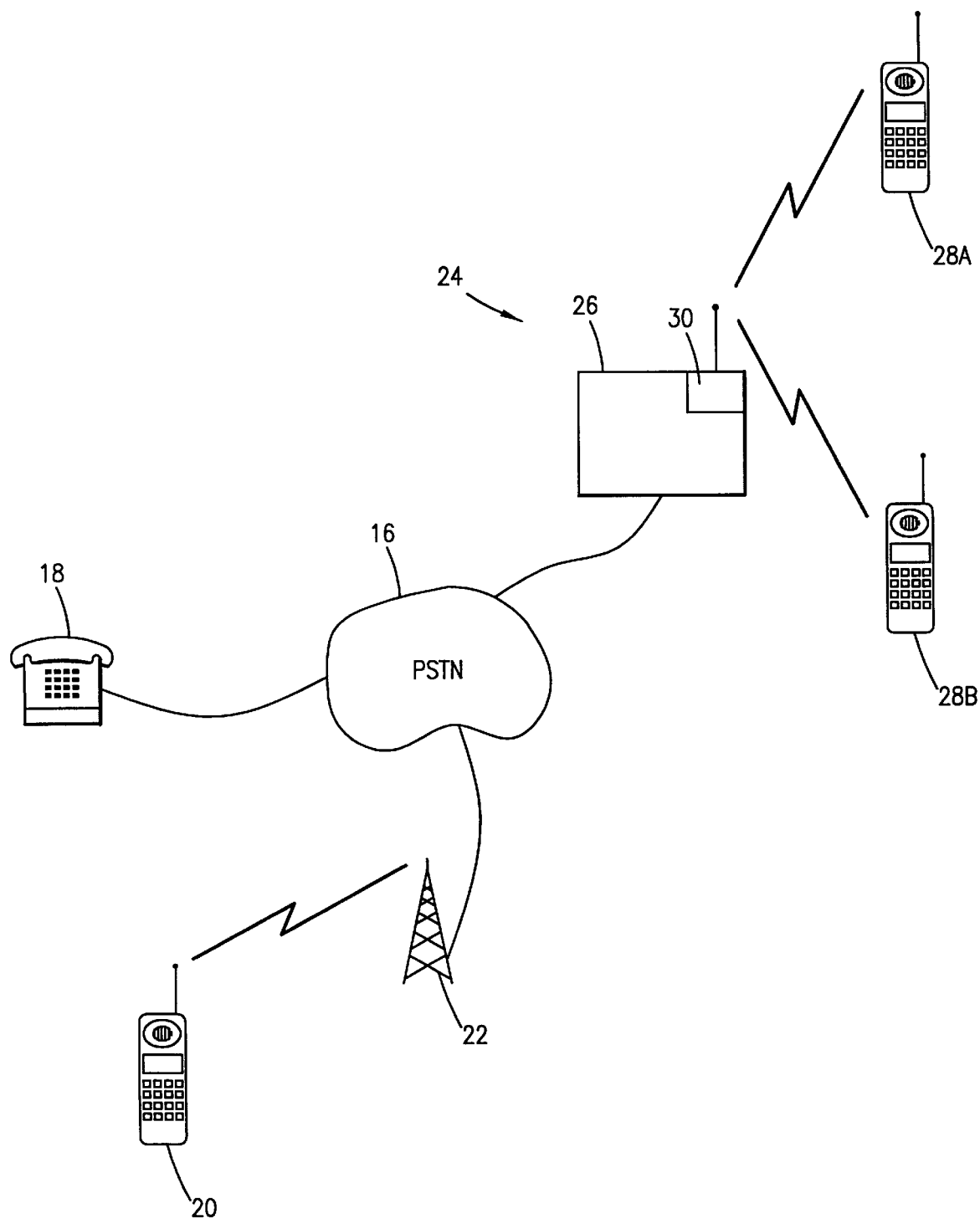
FIG. 2 is a schematic diagram of a private telephone system which utilizes the system and method of the present invention for implementing intercom and multiple voice channel capabilities using the conventional components within the private telephone system.

As described hereinbefore, the system and method of the present invention, for providing intercom and multiple voice channel capabilities within a private cordless telephone system, may be implemented within the private telephone system 24 shown in FIG. 2 utilizing standard cellular phone hardware instead of proprietary telephone hardware, e.g., the cordless phones 14A and 14B in FIG. 1. With the increasing cross-platform standardization in this area, i.e., between cellular and cordless technologies, particularly, regarding the air interface, the terminals 28A and 28B may function in either environment with minor software not hardware modifications, as described hereinbefore.

With Time Division Multiple Access (TDMA) systems, such as GSM or D-AMPS, speech, data and control signals are transmitted over a multiplicity of sequential transmission bursts, as is understood in the art. These bursts are grouped into a multiplicity of discrete, sequential transmission frames, each of which is divided into a multiplicity of discrete, sequential timeslots. For simplicity, the GSM standard will be utilized hereinafter for exemplary purposes in describing the background and the subject matter of the present invention. It should, nonetheless, be understood that the principles set forth in the present disclosure are applicable to other cellular standards, e.g., D-AMPS.

In GSM, each TDMA transmission frame, designated FRM in FIG. 5, has eight timeslots ($TS_0$ to $TS_7$) therein, each of which contains a multiplicity of informational and control bits therein, each timeslot being assigned to a different user. As discussed hereinbefore, a full rate speech channel in a standard cellular system 24 when in cordless mode (or in the cordless telephone system 10), based upon a cellular TDMA standard like GSM, requires a downlink slot, i.e., from the private base station 26 to the aforesaid terminal 28B, and an uplink slot, i.e., from the terminal 28B back to private base station 26. With further reference to FIG. 5, the downlink slot in each frame FRM is, for example, the first timeslot $TS_0$ therein and the uplink slot is timeslot $TS_3$, where the downlink frequency is designated $f_1$, and where the uplink frequency is designated $f_2$. For a frequency-hopping air interface, consecutive uplink slots can use different carrier frequencies in the spectral band for uplink transmission, whereas consecutive downlink slots will use corresponding downlink carriers in the spectral band for downlink transmission. Conventional cellular standards like GSM and D-AMPS apply Frequency Division Duplex (FDD), i.e., the uplink and downlink carriers use different frequencies with a fixed offset. For example, in GSM, the offset between the uplink and the downlink is 45 MHz. For simplicity, a non-hopping system is assumed in the following examples.

Current terminal technology only implements the functions as illustrated in FIG. 5, where the first time slot in the frame FRM, $TS_0$, is used for the reception of downlink signals from the (private or cellular) base station 26 and the fourth time slot, $TS_3$, is used for transmission of uplink signals to the (private or cellular) base station 26. As is understood in the art, a given time interval between $TS_0$ and $TS_3$ is necessary for the frequency synthesizer, also described further hereinafter, to switch between the RX frequency $f_1$ and the TX frequency $f_2$.

In addition, this time interval is required due to timing advance considerations because of the propagation delay from a cellular base station within the overlaying cellular network to the terminal and back, the cellular base station may order the cellular terminal to advance its uplink transmission so that slots from different uplink transmissions (different users) do not overlap. Due to the aforementioned timing advance, the time interval between $TS_0$ and $TS_3$ in the terminal 28B is smaller than exactly the duration of two time slots, i.e., $TS_1$ and $TS_2$. Also, time slots $TS_5$ and $TS_6$ are usually reserved in the terminal for signal strength measuring purposes, as also shown in FIG. 5. The consecutive actions within terminals 28A and 28B of reception, transmission, and measuring repeat every frame, and in most current terminal hardware, these processes are implemented in hardware.

It will, accordingly, be understood that a conventional cellular terminal with today's technology can only support a single duplex channel, that is, it can process only one downlink slot and one uplink slot per transmission frame FRM. Moreover, a private base station 26 based on today's terminal technology can also only support a single duplex channel. Therefore, without the advancements set forth in the present disclosure, the private base station 26, as shown in FIG. 2, can be in communication with a single portable user, i.e., terminal 28A or 28B only. This hardware limitation naturally hinders the implementation of functions like intercom between two portable users, e.g., the aforementioned users of terminals 28A and 283, and servicing more than a single portable user of the system 24 to an outside line.

It should further be understood that, as a result of the rapid growth in demand for cellular services, the available transmission capacity in some areas became saturated, a technological bottleneck that eroded customer satisfaction. By providing a different voice encoding scheme which essentially uses half the data rate compared to conventional voice encoding schemes as being applied in full-rate standards, such as illustrated in FIG. 5, half-rate standards, such as illustrated in FIG. 6, readily double the number of mobile users that can be serviced by the private telephone system 24 without noticeably compromising speech quality. In FIG. 6, a half-rate speech channel is shown, where the timeslots constituting a traffic channel for a particular single user are on every other frame FRM, e.g., the odd frames only.

The half-rate channel technique, as utilized in cellular systems, can be used to solve the above-described hardware limitations in the private base station 26 as well. Through the implementation of the aforesaid half-rate encoding of speech and other transmission data, full intercom capability may be provided to the private telephone system 24 in accordance with the system and method of the present invention, enabling the two terminals 28A and 28B to communicate with each other, through the private base station 26, which, as discussed, acts as a relay. Unlike the previous system, such as illustrated in connection with FIG. 5, however, where only one intercom user could transmit, in the system and method of the present invention, full duplex is available to the users, as in a conventional telephone conversation mode, the private base station 26 relaying the conversations in alternate frames.

Figure 7:
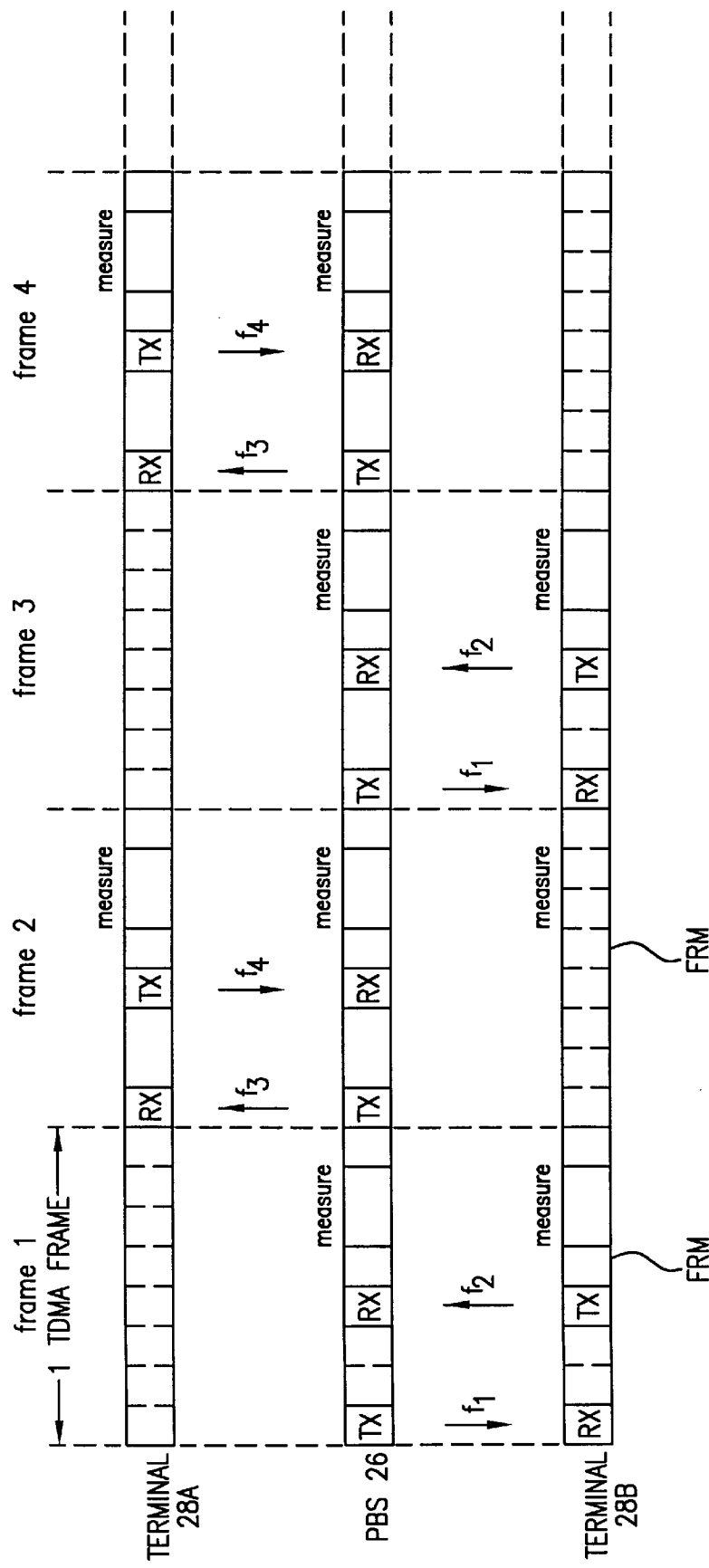
FIG. 7 is a block diagram illustrating the transmission frame structure of speech and other transmission data within the private telephone system of FIG. 2 in accordance with the present invention.

With reference now to FIG. 7, there is illustrated an implementation of the aforementioned modification to the cellular interface, where the private telephone system 24 employs two different channels, each at half-rate. In the first transmission frame, i.e., frame 1 in the figure, the private base station 26 is in half-rate communication with terminal 28B, as in FIG. 6, using the RX frequency $f_1$ and the TX frequency $f_2$, as also shown in FIG. 6, which, as discussed, means that this communication occupies the odd-numbered frames FRM. Similarly, private base station 26 is also in simultaneous, as perceived by the user, half-rate communication with terminal 28A, but across the even-numbered frames FRM, as also shown in FIG. 7. Furthermore, the frequencies used in the odd and even frames may differ. That is, the slots used for the two separate channels do not have to reside on the same carrier frequency as was required in full-rate multi-slot channel as discussed before, e.g., using RX frequency $f_3$ and TX frequency $f_4$ for the other half-rate communication with terminal 28A. More particularly, the aforementioned adaptive channel allocation algorithm, discussed heretofore in connection with applicant's co-pending patent applications, incorporated herein by reference, can optimize the channel selection for the two channels independently.

Figure 8:
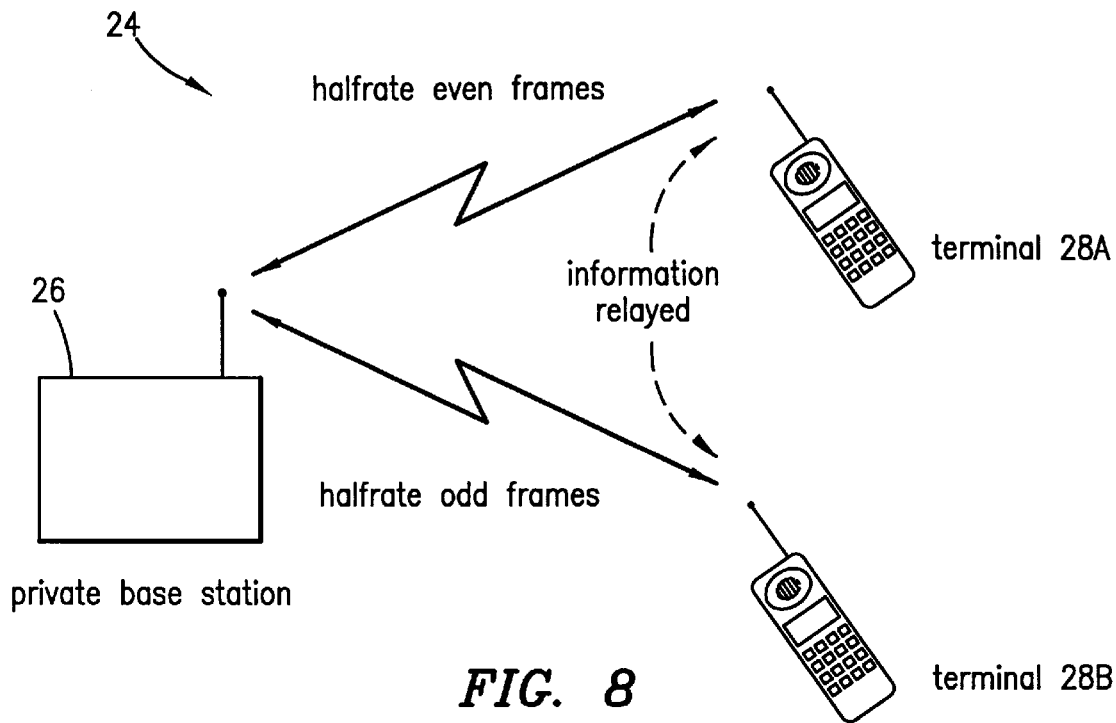
FIG. 8 is a schematic diagram illustrating the implementation of intercom capability with half rate speech coding in the private telephone system shown in FIG. 2 in accordance with the system and method of the present invention.

With reference now to the private telephone system 24 shown in FIG. 8, the exchange of information between the terminals 28A and 28B, i.e., an intercom, is mediated by the private base station 26. In order to establish an intercom call between the two portable terminals 28A and 28B, one user, for example, the user of terminal 28A, preferably establishes a mobile-originated call to the private base station 26. Subsequently, terminal 28A issues a request for an intercom connection to terminal 28B within the private telephone system 24. In this request, the user of terminal 28A may have to insert the cordless number, mobile number, or a short number associated with terminal 28B. On receipt of this request, private base station 26 establishes a mobile-terminated call to terminal 28B. The private base station 26 then allocates a half-rate traffic channel, preferably by using the aforementioned adaptive channel allocation technique, for communications between the private base station 26 and terminal 28A. In addition, private base station 26 may apply an adaptive channel allocation algorithm to find a free channel for use as a half-rate traffic channel between the private base station 26 and terminal 28B.

Figure 9:
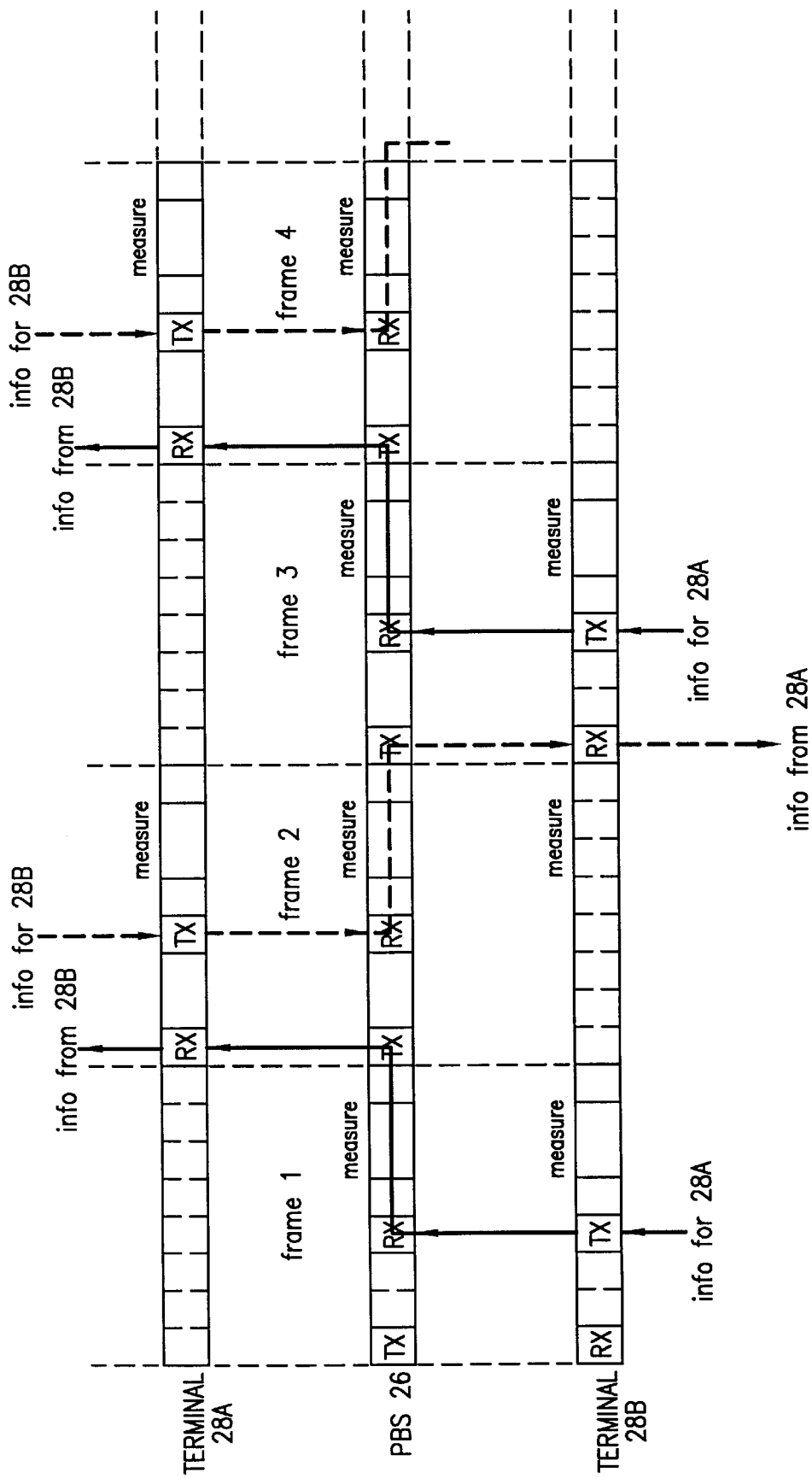
FIG. 9 is a block diagram further illustrating the transmission frame structure of speech and other transmission data illustrated in FIG. 7.

It is understood that this second channel to the terminal 28B can (but not necessarily) be on a different carrier frequency and different time slot as the connection to terminal 28A. The half-rate channels are staggered by one frame, i.e., for the communications to and from terminal 28A the even-numbered frames are used, and for the communications to and from terminal 28B the odd-numbered frames are used, as shown in FIG. 7. The private base station 26 applies the intercom functionality by simply relaying the signals, as received, from one terminal to the other terminal across the pertinent allocated channels. This relay functionality at the frame level is further illustrated in FIG. 9, where the user of terminal 28B in frame 1 transmits information, e.g., voice, data or control signals, in timeslot $TS_3$ to the private base station 26, which forwards the information, as received, to terminal 28A in timeslot $TS_0$ of the succeeding frame, i.e., frame 2. Simultaneous with said reception, the user of terminal 28A transmits information for the user of terminal 28B to the private base station 26, which forwards it to terminal 28B for transmission during timeslot $TS_0$ in the next frame, i.e., frame 3, etc.

Figure 3:
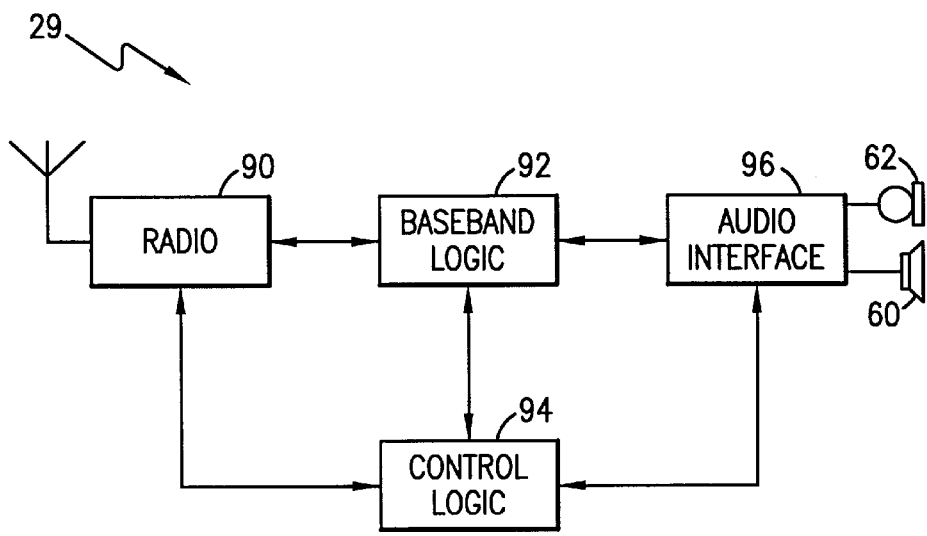
FIG. 3 is a block diagram generally illustrating the conventional components within a mobile terminal such as used in the private telephone system shown in FIG. 2.
Figure 4:
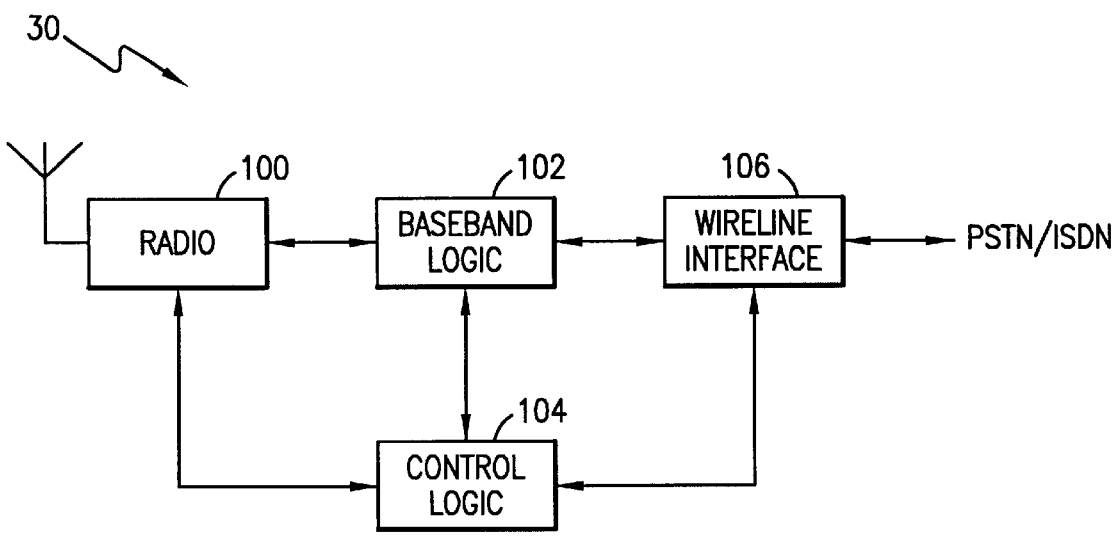
FIG. 4 is a block diagram generally illustrating the components within a conventional private base station such as used in the private telephone system shown in FIG. 2.
Figure 10:
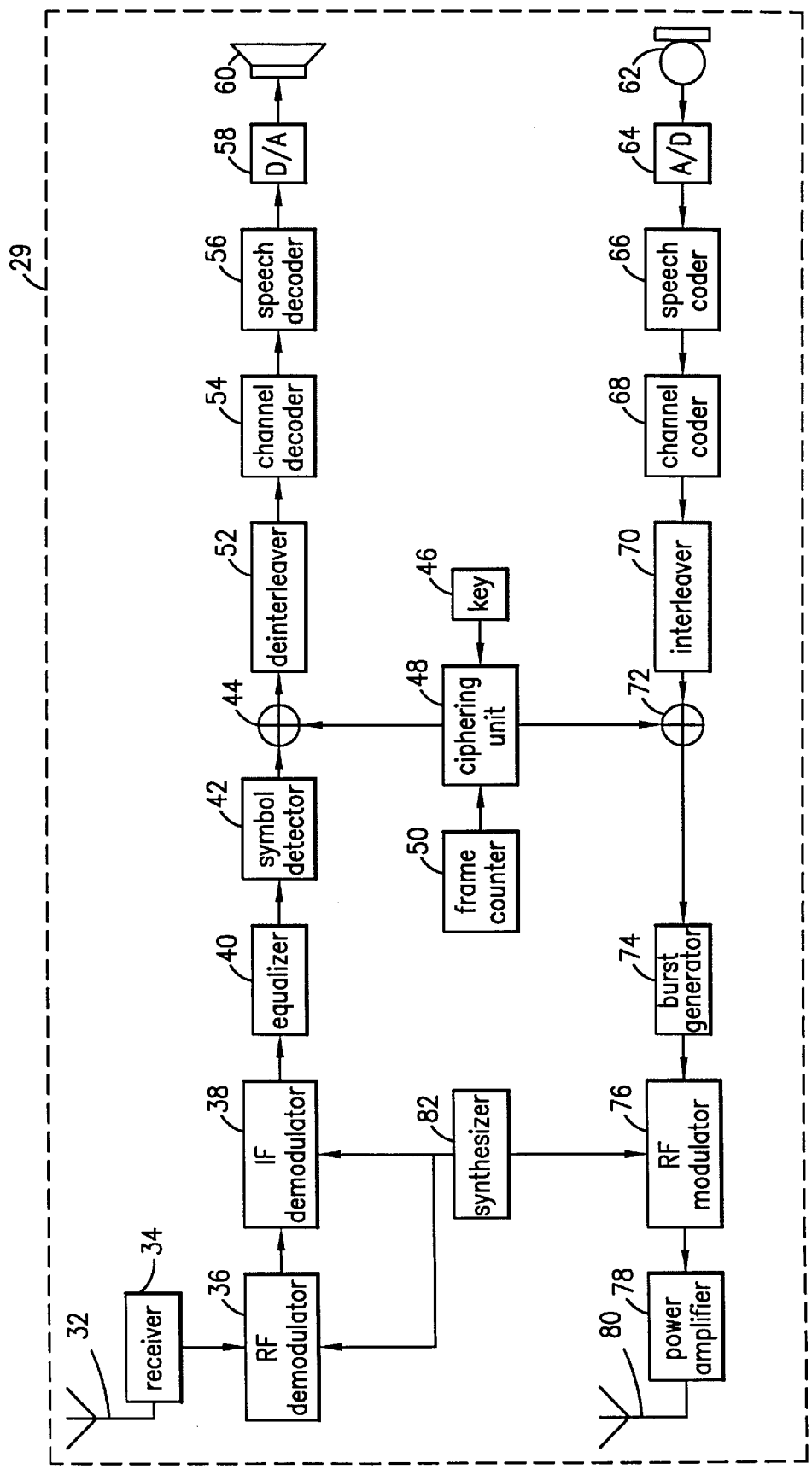
FIG. 10 is a block diagram illustrating a conventional terminal transceiver, components of which are used in the following embodiments of the private base station transceivers of the present invention.

With reference now to FIG. 10 of the drawings, there is illustrated in greater detail the basic building blocks of the aforementioned transceiver 29, such as found in a conventional cellular terminal, e.g., terminal 28A, as also generally illustrated in FIG. 3. It should be understood to those skilled in the art, however, that the aforementioned cellular terminal implementation shown in FIG. 10 may also be used to derive an implementation of the transceiver 30 within the private base station 26, as illustrated in FIGS. 2 and 4.

With reference again to FIG. 10, in such a transceiver 29 (or 30), a radio signal is received at an antenna 32, after which the signal is amplified in a receiver 34, down-converted and filtered in an RF demodulator 36 and an IF demodulator 38. Then the down-converted signal is fed into an equalizer 40 to compensate for the radio channel and to adjust timing and frequency synchronization, as is understood in the art. The bits are recovered in a symbol detector 42, and modulo-2 added in an adder 44 with a cipher key derived in a ciphering unit 48 from an associated frame counter 50 and a private user key 46 to decipher the information. It should be understood that the modulo-2 adder 44 in effect constitutes an exclusive-or (XOR) operator, where a digital signal XORed with zero is the original signal and Xored with a string of ones is an inverse. The deciphered, e.g., inverted, information is then fed into a de-interleaver 52, a channel decoder 54 and a speech decoder 56. The output of the speech decoder 56 is normally in the form of PCM (Pulse Coded Modulation) samples which are fed into an D/A converter 58. Finally, an audible signal is produced at the transceiver 29 by a speaker 60 therein.

The reverse process, i.e., the generation and transmission of a signal by the transceiver 29, is similar to the above. In this scenario, audible signals, i.e., from the user's voice, are picked up by a microphone 62 within transceiver 29. An A/D converter 64 then samples the incoming signal and converts it into the aforementioned PCM samples, which are fed into a speech coder 66, a channel coder 68, and an interleaver 70, as is understood in the art. The output of the interleaver 70 feeds into another modulo-2 adder 72 where the signal is ciphered by the aforementioned ciphering unit 48 with the same or another private or secret user key 46, e.g., XORed as above. The ciphered bits from the adder 72 are fed into a burst generator 74, followed by an RF modulator 76 and a power amplifier 78. The power amplifier then transmits the RF signals into the air via the TX antenna 80.

With further reference to FIG. 10, a frequency synthesizer 82 operates on the incoming signal, e.g., at the RF demodulator 36 and the IF demodulator 38, and the outgoing signal, e.g., at the RF modulator 76, as is understood in the art.

With reference again to FIG. 9, it is clear that the private base station 26 delays the signals received from one terminal, e.g., terminal 28B in frame 1, in one frame to the next, where the received information is transmitted to another terminal, e.g., terminal 28A in frame 2. Incorporating the mobile terminal transceiver 29 technology shown in FIG. 10 into the PBS transceiver 30 of FIG. 2, it should be understood that the transceiver 30 within the private base station 26 can simplify the transmission between two intercom users by interrupting the signal path flow from antenna 32 to speaker 60 (signal receiving portion) to microphone 62 to antenna 80 (signal transmitting portion) and diverting the incoming signals from the aforementioned signal receiving portion to a corresponding component in the signal transmitting portion. For example, in a first embodiment of the present invention, illustrated in FIG. 11 of the drawings, signals are transferred from adder 44 to adder 72; in a second embodiment of the present invention, illustrated in FIG. 12, signals are transferred further along the signal receiving portion pathway shown in FIG. 10 from the channel decoder 54 to the channel coder 68; and in a third embodiment of the present invention, illustrated in FIG. 13, the signals are transferred still further and pass from the speech decoder 56 to the speech coder 66.

Shorter signal diversions or shuntings are generally not preferred in practice because some processing in the private base station 26 is required. In particular, a ciphering procedure is usually defined for each channel separately, i.e., between the base station 26 and each terminal 28A and 28B, respectively, rather than between terminal 28A and terminal 28B. For example, in GSM, the ciphering algorithm is based on the TDMA frame numbering (such as applied by the frame counter 50) and on a particular private user key 46 obtained at the time of connection. It should be understood that the frame numbering will be different for terminals 28A and 28B since their respective traffic channels utilize different frames, i.e., even-numbered and odd-numbered frames, respectively, as discussed in connection with FIGS. 7 and 9. In addition, the private user keys 46 used by the respective terminals are preferably different.

Additionally, the signals shifted from the signal receiving portions to the respective signal transmitting portions of the various embodiments are preferably temporarily stored, e.g., to collect a speech segment worth of signals, to facilitate the signal shift, as will be described in more detail hereinafter. Accordingly, continuous streams of signal data may accumulate within storage for subsequent "burst" transmission, e.g., the aforementioned speech segment. Conversely, the burst mode transmissions may be stored and forwarded on in a more controlled, continuous stream to other devices.

Figure 11:
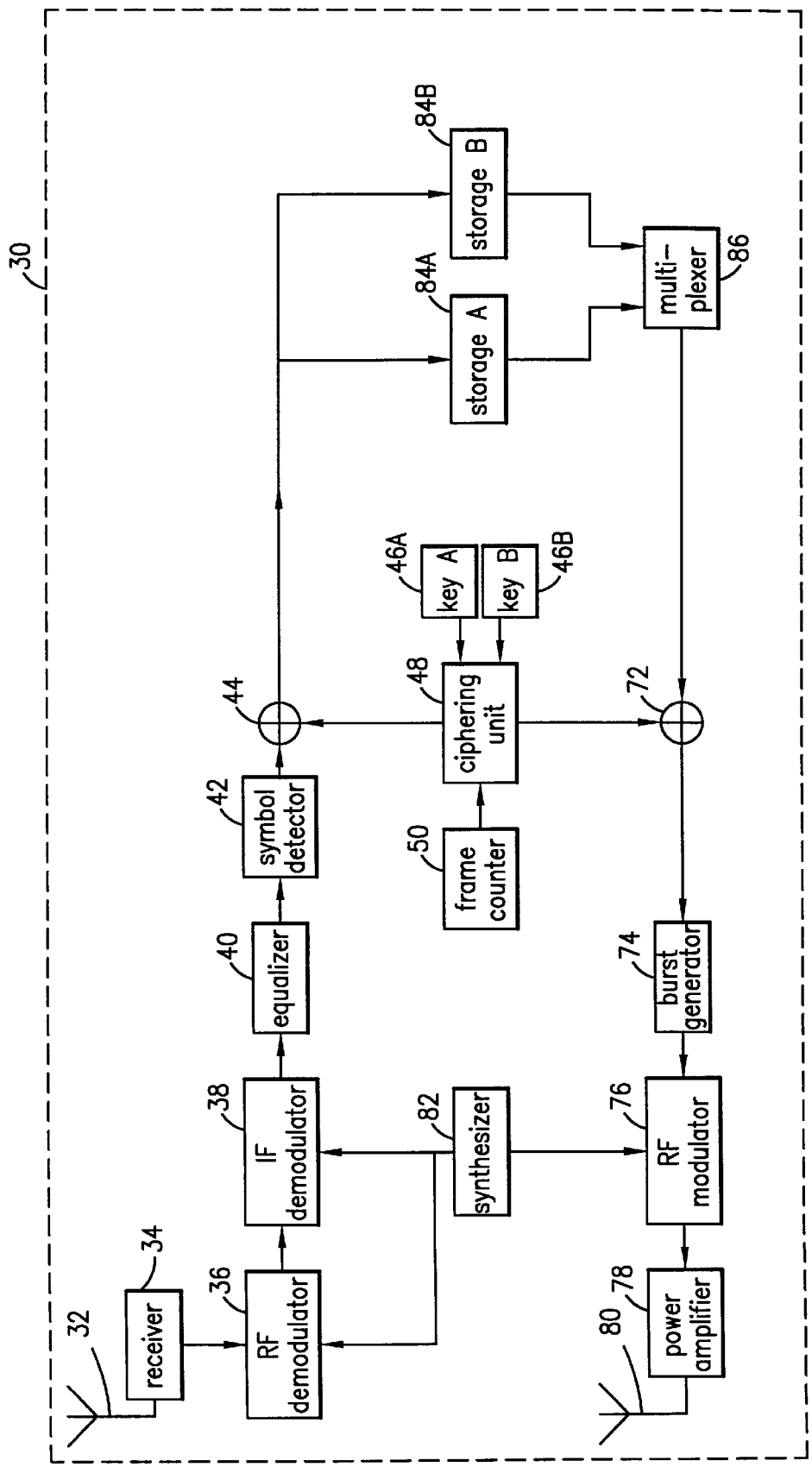
FIG. 11 is a block diagram of a transceiver component as used in a first preferred embodiment of the present invention.

Accordingly, in the first preferred embodiment of the transceiver 30 of the present invention, illustrated in FIG. 11 of the drawings, the information received from one terminal, e.g., terminal 28B in frame 1, is deciphered first using one private user key 46A, and subsequently ciphered for transmission to the other terminal, e.g., terminal 28A using a second private user key 46B. It should be understood that the relay components discussed heretofore in connection with FIG. 10, i.e., antennae 32, receiver 34, RF demodulator 36, IF demodulator 38, equalizer 40, symbol detector 42, adder 44, ciphering unit 48 with associated frame counter 50, adder 72, burst generator 74, RF modulator 76, power amplifier 78, antennae 80, and synthesizer 82, are duplicated in this first and in subsequent embodiments of the invention.

With reference again to FIG. 11, intermediate storage devices 84A and 84B are illustrated which constitute the aforementioned intermediate storage devices necessary in a TDMA system since signals received in one TDMA frame can only be transmitted in the next TDMA frame, which as discussed hereinbefore introduces the transmission delay. A multiplexer 86 provides the requisite control in feeding the appropriate data from the respective intermediate storage devices to the adder 72 in a timely fashion. For example, the information stored in storage device 84A is used during the even frames, whereas the information stored in storage device 84B is used during the odd frames, the multiplexer 86 governing the information transference. Keys 46A and 46B represent the different private user keys for the two channels to terminals 28A and 28B, respectively.

It should be understood, however, that in certain hardware implementations, it might be preferable to decode the received signals as well and then to re-encode them when transmitting them. The latter is preferable when demodulation processes for the physical layer, like equalization, symbol recovery, and channel decoding are integrated in a single processing module or an integrated circuit. In that case, it might be easier from a private base station 26 implementation point of view to derive and relay the user information than to derive and relay the raw bits. Accordingly, it should be understood that the coding components also discussed heretofore in connection with FIG. 10, i.e., the deinterleaver 52, channel decoder 54, channel coder 68 and interleaver 70, are duplicated in the second embodiment and subsequent embodiments of the invention.

Figure 12:
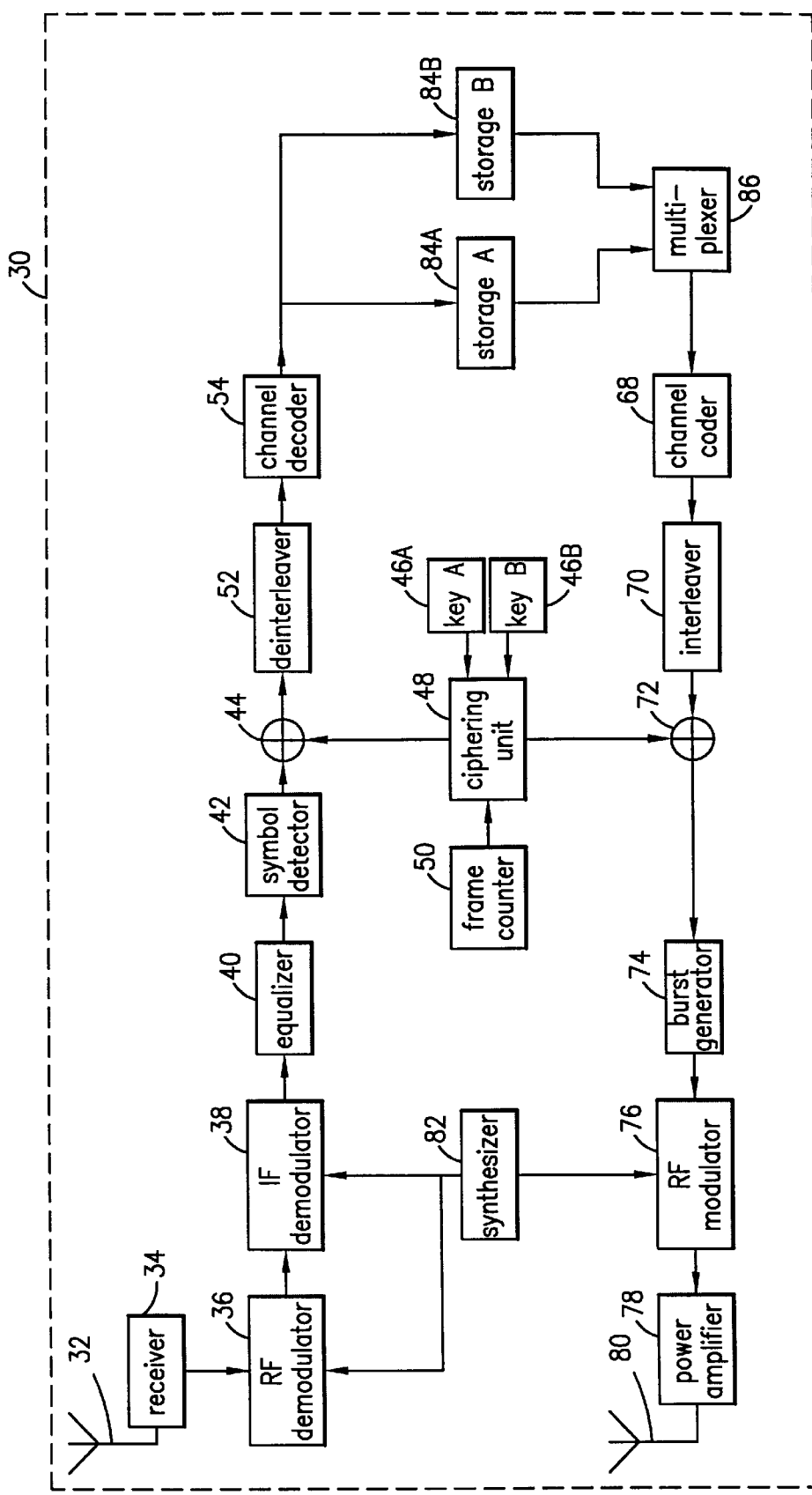
FIG. 12 is a block diagram of a transceiver component as used in a second preferred embodiment of the present invention.

With reference to FIG. 12, an example of this second embodiment is illustrated which includes the intermediate storage devices 84A and 84B, as in the first embodiment. However, compared to the solution in that embodiment, the solution in FIG. 12 has a longer round-trip delay due to the interleaving time interval caused by the aforementioned coding components. It should be understood that in this embodiment of the present invention the signal path from the antennae 32 to the channel decoder 54 constitutes the signal receiving portion and the signal path from the channel coder 68 to antenna 80 constitutes the signal transmitting portion of the private base station 26.

Figure 13:
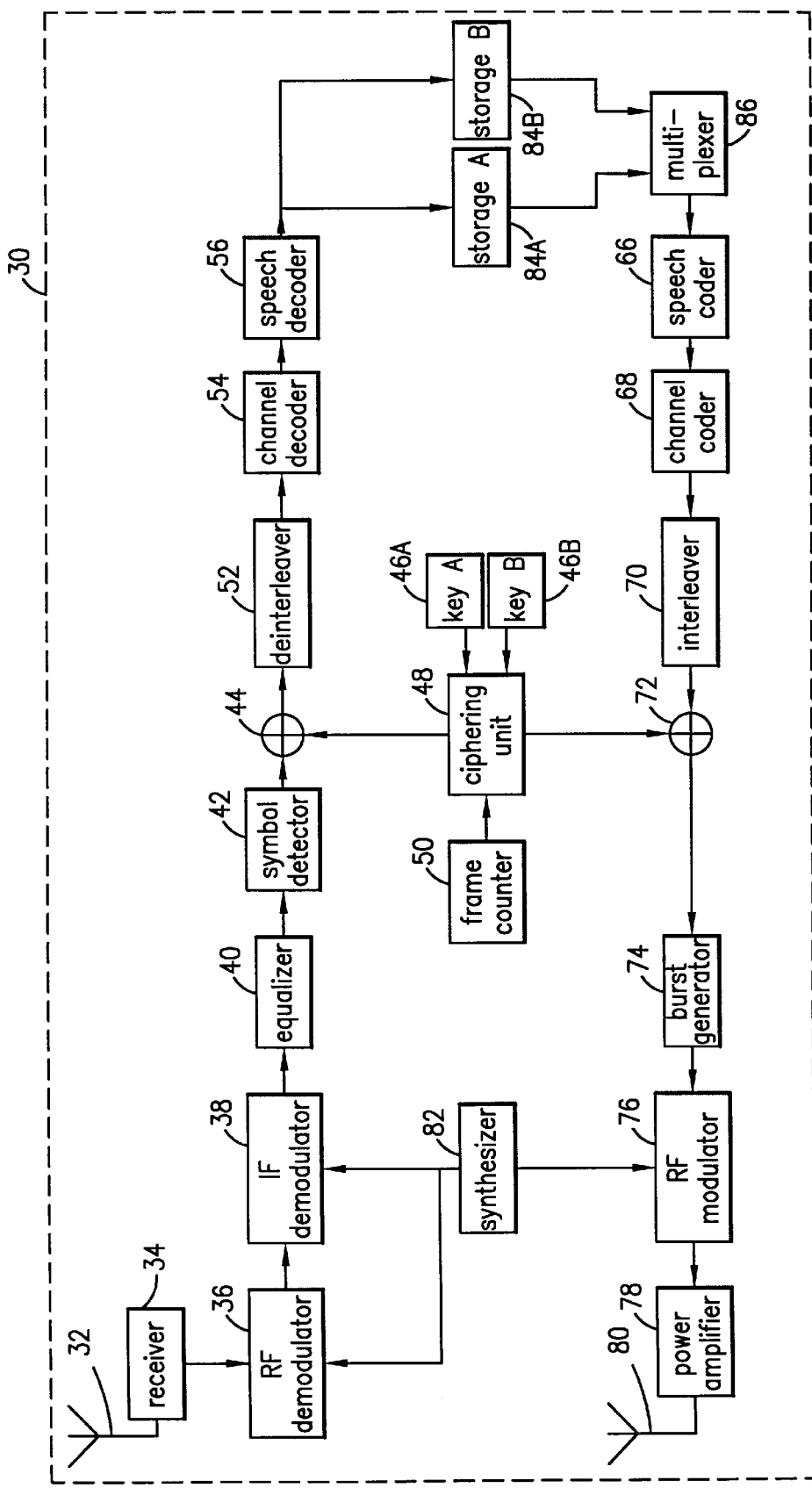
FIG. 13 is a block diagram of a transceiver component as used in a third preferred embodiment of the present invention.

In yet another embodiment, the relay function takes place after the speech coders. In principle, with reference again to the transceiver in FIG. 10, it is possible to process the received signals up until the PCM samples at the output of the speech decoder 56, and relay the samples to the corresponding component, i.e., the speech coder 66, at the outgoing signal stream side to be transmitted to the other terminal, avoiding digital-to-analog conversion and analog-to-digital conversion in converters 58 and 64, respectively. This third embodiment of the present invention is illustrated in FIG. 13, where additional coding components, i.e., the speech decoder 56 and coder 66, are added. In other words, in this third embodiment of the present invention the signal receiving portion constitutes the signal pathway from the antenna 32 to the speech decoder 56 and the signal transmitting portion constitutes the signal pathway from the speech coder 66 to antenna 80. With this embodiment and each of the aforedescribed previous embodiments, a simultaneous, as perceived to the users, two-way conversation is had between two terminal users of the telephone system 24, i.e., an intercom mechanism.

Figure 14:
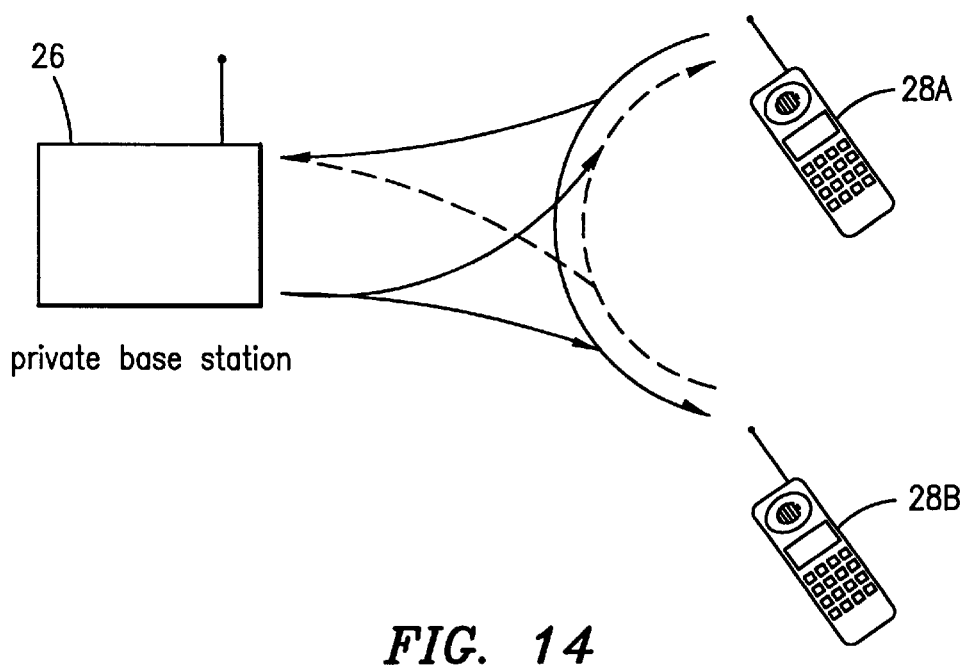
FIG. 14 is a schematic diagram illustrating a fourth preferred embodiment of the present invention, also shown in FIG. 15 hereinafter, where an implementation of three-way intercom functionality employing the private telephone system shown in FIG. 2 is employed in accordance with the system and method of the present invention.
Figure 15:
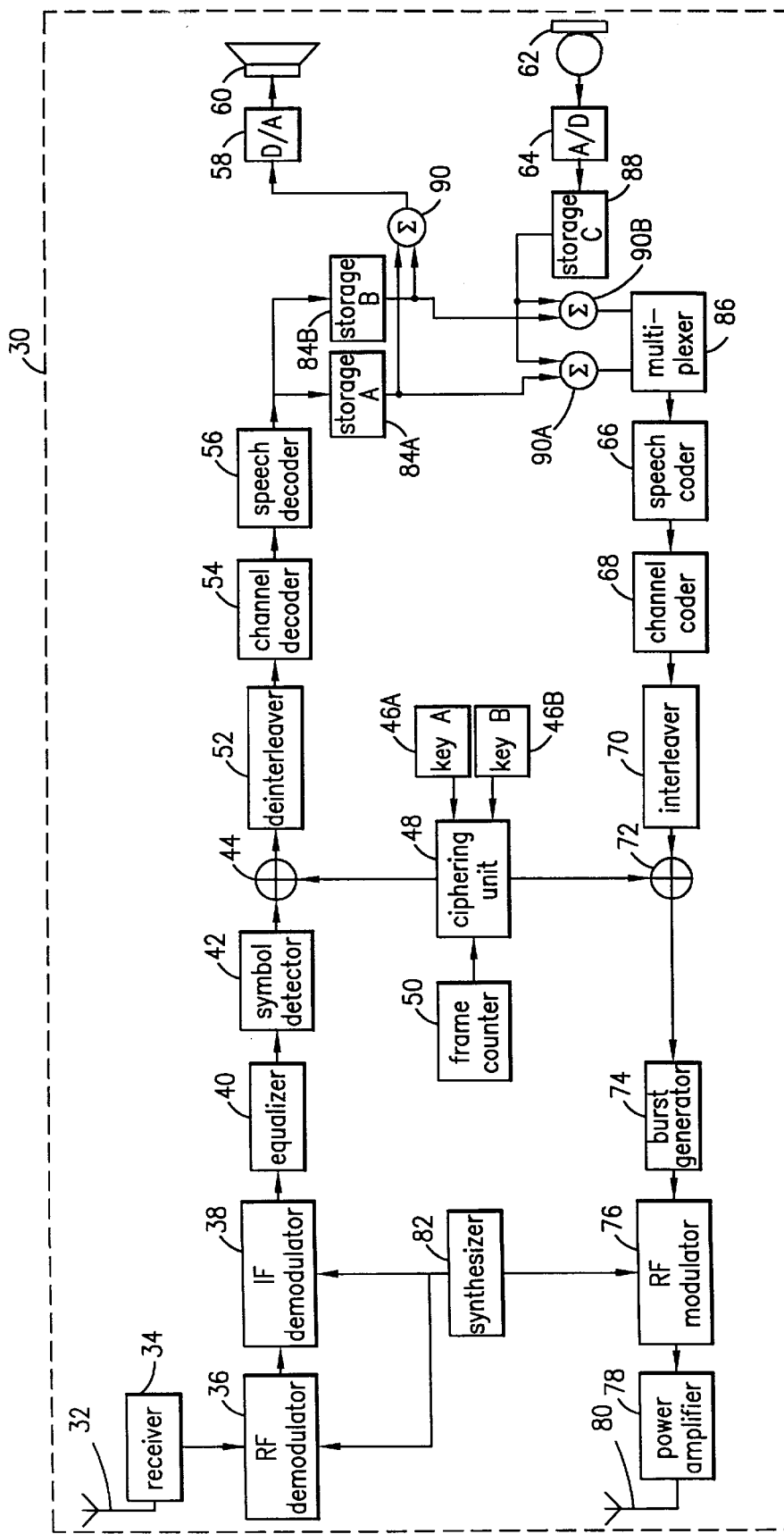
FIG. 15 is a block diagram of a transceiver component as used in the fourth preferred embodiment of the present invention also shown in FIG. 14.

In a fourth embodiment of the system and method of the present invention, illustrated in FIGS. 14 and 15, a third user, at the fixed private base station 26, may join in the aforedescribed intercom conversation between the two portable users in a conference call manner. Unlike the aforedescribed two-user communication of FIG. 8, where the private base station 26 is used solely as a relay unit, the aforementioned three-way communication between both portable users, i.e., at terminals 28A and 28B, and the third user, i.e., at the locus of the private base station 26, is illustrated in FIG. 14, where each user hears the other two, with the users at terminals 28A and 28B operating in a syncopated relay mode, as described, i.e., on alternating TDMA transmission frames. It should first be noted that most conventional cordless systems (not necessarily based on a cellular standard) provide three-way intercom functionality between the fixed private base station 26 two or more portable speaker-phones. Such functionality can be implemented in the private telephone system 24 described in this invention as well.

With reference again to FIG. 14 of the drawings, there is shown an example of the three-way exchange of information between the users of the terminals 28A and 28B and a user at the private base station 26, illustrating three-way intercom functionality. It should be understood that in this embodiment the hardware for the private base station 26 may again be composed of conventional cellular technology. For the two portable users, i.e., terminals 28A and 28B, the two staggered half-rate channels are applied as described before in connection with FIG. 8. However, in addition to merely relaying the signals, the private base station 26 in the present invention taps off the communications between the two portable users and makes them audible to the fixed user at the private base station 26. In addition, any audible information from this fixed user may be transmitted to both portable users by adding this information on top of the relayed information. No modifications in the cellular terminals 28A and 28B are required. A preferred hardware configuration to implement this three-way communication is illustrated in FIG. 15.

With reference now to FIG. 15, the preferred fourth embodiment of the aforementioned transceiver 30 within the private base station 26 of the present invention is further illustrated. In this fourth embodiment, the signals received from each portable terminal are processed up until the PCM samples, i.e., to speech decoder 56 and coder 66. It should be understood that conventional speech coders, also called vocoders, compress the voice signals by making a model of the human voice organs and then applying an excitation such that the produced sound resembles the desired sound as much as possible. Since human voice organs do not change very quickly, a small segment of speech, usually 20 ms worth, is coded as a block, i.e., for a voice signal lasting 20 ms the model and the excitation is determined and digitized. In the private base station 26 of the present invention, for example, a 20-ms voice segment received from terminal 28A and a 20-ms voice segment received from terminal 28B are stored in memory locations or storage devices 84A and 84B, respectively, after PCM coding. In addition, a 20-ms segment as received from the fixed user at the private base station 26 through microphone 62 and A/D converter 64 is stored in memory or within a storage device 88.

When both 20-ms segments in memories 84A and 84B are ready (due to the staggering of the half-rate channels, the segment received from one terminal will be ready earlier than the segment from the other terminal), their contents are summed in a first summation device 90, and preferably normalized, and then fed to the aforedescribed D/A converter 58, after which the signals are made audible in the speaker 60 for the benefit of the fixed user at the private base station 26. In this way, the fixed user at the private base station 26 can hear both portable users. In addition, when it is time to relay the information from one user to the other user, the contents of memory 88 and memory 84A, as well as the contents of memories 88 and 84B, are added in respective summation devices 90A and 90B, normalized, and transmitted to the portable users, i.e., to the terminals 28B and 28A, in the odd-numbered and even-numbered frames, respectively. In this way, the portable users hear both the other portable user and the fixed user.

In the aforedescribed manner a simultaneous, as perceived by the users, three-way conversation is had between the two portable users and the one fixed user of the telephone system 24, i.e., a three-way intercom or conference call mechanism. It should be understood and is further emphasized here that both the two-way intercom and three-way intercom functionality of the system and method of the present invention can be implemented with conventional cellular terminals, and a private base station 26 whose hardware is based on conventional cellular terminal technology.

Figure 16:
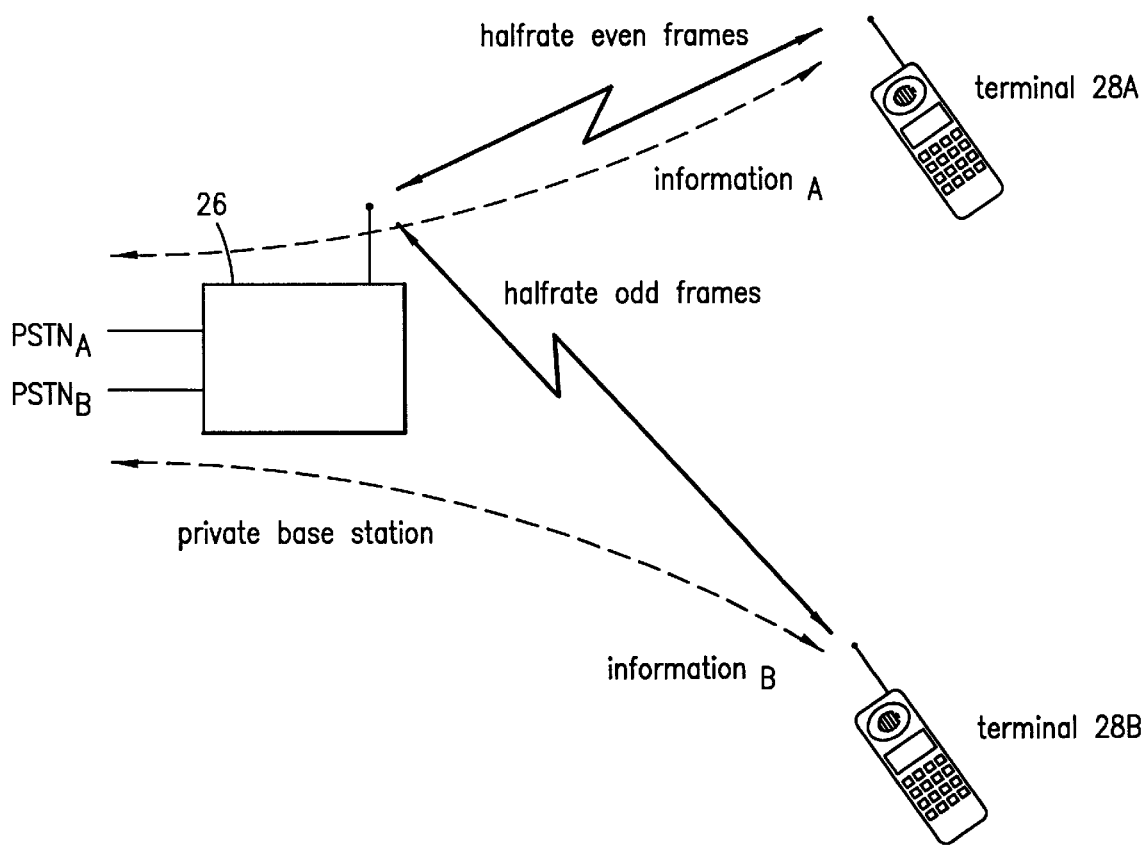
FIG. 16 is a schematic diagram illustrating the implementation of multiple voice channel capability with half rate speech coding in the private telephone system shown in FIG. 2 in accordance with the system and method of the present invention.

With reference now to FIG. 16, there is illustrated a multiple channel scenario where two users, e.g., of terminals 28A and 28B, respectively, within the telephone system 24 of the present invention each simultaneously communicate with remote users via the PSTN 16, as also shown in FIG. 2. In particular, the terminal 28A user, using the aforementioned even-numbered transmission frames FRM, transmits a half-rate message to the private base station 26, at which a first channel, designated $PSTN_A$ in FIG. 16, is opened to the PSTN 16 for a remote communication by the terminal 28A user to a given remote wireline (or wireless) user across the PSTN 16. Similarly, the terminal 28B user, using the aforementioned odd-numbered frames FRM, transmits a half-rate message to the private base station 26, at which point a separate second channel, designated $PSTN_B$, is opened to the PSTN 16 for another, separate remote communication to another remote wireline (or wireless) user across the PSTN 16.

Figure 17:
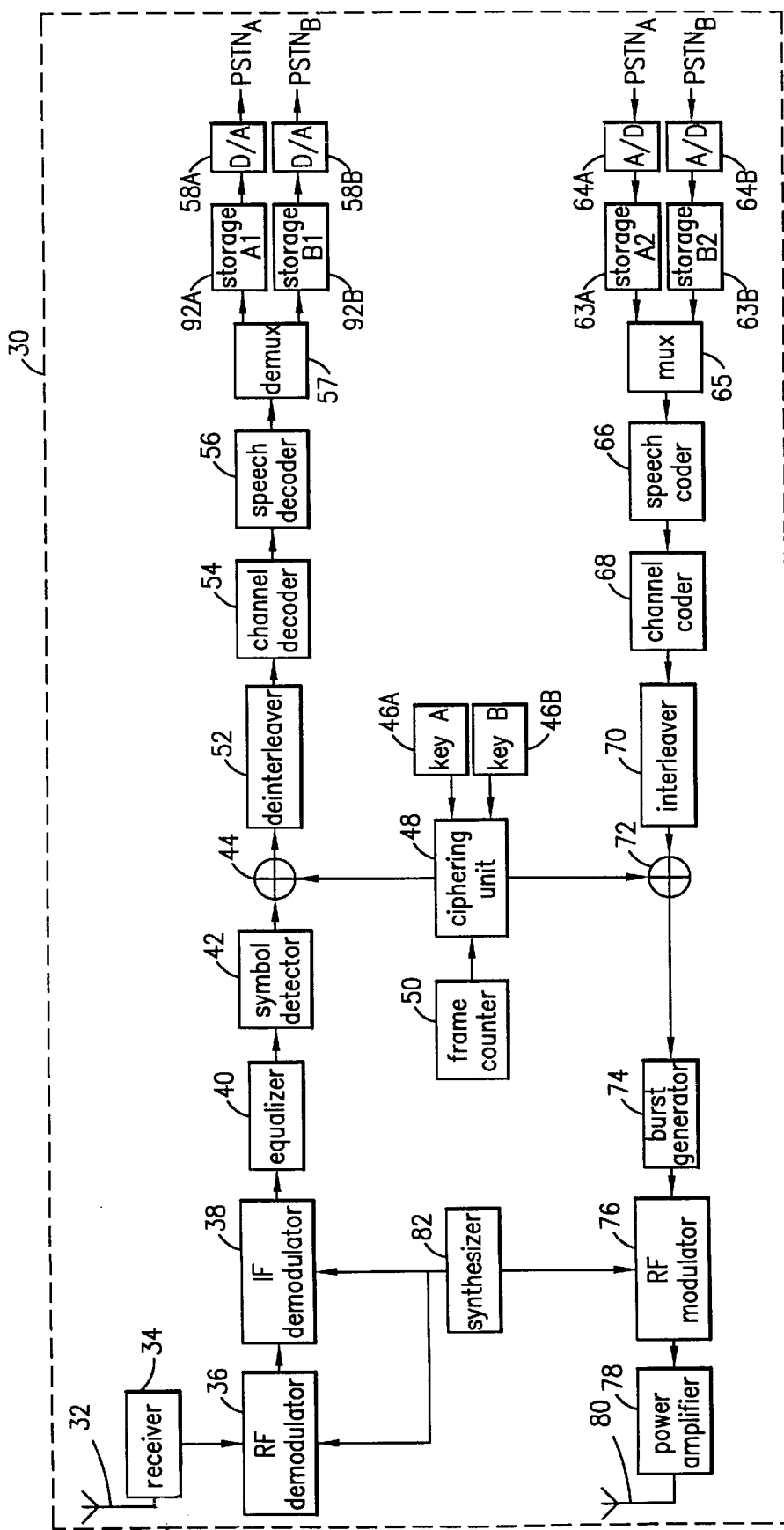
FIG. 17 is a block diagram of a transceiver component as used in a fifth preferred embodiment of the present invention also shown in FIG. 16.

With reference now to FIG. 17, the preferred embodiment of the transceiver 30 within the private base station 26 for implementing the multiple channel scenario is illustrated. As discussed in connection with the previous embodiments, particularly, FIG. 10, received signals from antenna 32 pass through various components to the speech decoder 56 and enter a demultiplexer 57, which routes alternate 20 ms speech segments derived within the speech decoder 56 into a memory 92A or a memory 92B, also referred to in FIG. 17 as storage A1 and storage B1, respectively. It should be understood that the speech stored within memories 92A and 92B is preferably in PCM format. The outputs from the respective memories 92A and 92B feed into respective D/A converters 58A and 58B, which convert the respective 20 ms speech segments into analog waveforms supplied to the respective outside PSTN 16 connections, $PSTN_A$ to D/A 58A and $PSTN_B$ to D/A 58B.

Similarly, incoming audible signals, i.e., from the aforementioned $PSTN_A$ and $PSTN_B$ are sampled and converted into PCM format in A/D converters 64A and 64B, respectively, and forwarded into respective memories 63A and 63B. As a 20 ms speech segment collects in memories 63A and 63B, also referred to in FIG. 17 as storage A2 and storage B2, respectively, the speech segments are alternatively provided to the speech coder 66 by a multiplexer 65, and further prepared for subsequent transmission on the odd and even frames.

In the aforedescribed manner simultaneous, as perceived to the users, and separate telephone communications may be made by the terminal 28A and 28B users to remote users outside the private telephone system 24 across the PSTN 16. As in the above embodiments, the multiple channel functionality set forth in this alternate embodiment of the present invention can be implemented with conventional cellular terminals and a private base station 26 with conventional cellular terminal technology therein, facilitating utilization of the concepts set forth in the instant application into existing devices.

It should be understood that although the embodiments of the present invention, as illustrated, show intercom usage between two users through utilization of half frame transmissions, the scope of the present invention is intended to cover multiple intercom usage, i.e., two or more users interleaved within the frame structure. It should further, of course, be understood that the advantage of perceived simultaneity may be comprised by so utilizing an n-rate transmission, i.e., discrete transmissions separated along the TDMA multiframe transmission spectrum by n frames therein. Nonetheless, users of terminals 28 in communication within the private telephone system 24 may accept such a compromise for purposes of intercom functionality.

Similarly, in connection with the alternative multichannel implementation, it should be understood that multiple links to the PSTN may be achieved through utilization of the aforementioned n-rate transmissions also, albeit by possibly compromising the signal.

It should also be understood that although the preferred embodiments of the present invention employ intermediate storage devices, such as devices 84A, 84B and 88 in FIGS. 11–13 and 15, the aforementioned brief transmission delay may instead be introduced through other means, understood by those skilled in the art.

It should further be understood that the aforedescribed intermediate storage devices 84A, 84B and 88 may constitute discrete memory locations within a computer memory (not shown), such as cache or highspeed memory.

The previous description is of preferred embodiments for implementing the invention, and the scope of the invention should not necessarily be limited by this description. The scope of the present invention is instead defined by the following claims.

What is claimed is:

1. A private base station within a private telephone system, said private base station being in wireless time division multiple access (TDMA) communication with a multiplicity of terminals also within said private telephone system, users of at least two of said terminals being in duplex intercom communication with each other via said private base station, said private base station comprising:

a signal receiving portion for receiving said duplex intercom communications between the users of said at least two terminals over respective half-rate channels;

a signal transmitting portion for transmitting said duplex intercom communications to said users of said at least two terminals over respective half-rate channels;

a signal interconnection means, connected to said signal receiving and signal transmitting portions, whereby a first communication from a first of said terminals is relayed within said private base station through said signal receiving portion, signal interconnection means and signal transmitting portion to at least a second of said terminals, and whereby a second communication from said second terminal is relayed within said private base station through said signal receiving portion, signal interconnection means and signal transmitting portion to at least said first terminal, users of at least said first and second terminals within said private telephone system being in duplex intercom communication with each other via said private base station, and a multiplicity of intermediate storage devices, connected to said signal interconnection means, for storing signals of said first communication and said second communication from said at least two terminals, each said intermediate storage device being connected to said signal receiving portion.

2. The private base station according to claim 1, wherein said signal interconnection means comprises a first and a second intermediate storage device, said first intermediate storage device for storing signals of said first communication and said second intermediate storage device for storing signals of said second communication.

3. The private base station according to claim 2, wherein said signal interconnection means further comprises a multiplexer, connected to said first and second intermediate storage devices and said signal transmitting portion, for controlling the forwarding of said stored signals from said first and second intermediate storage devices to said signal transmitting portion.

4. The private base station according to claim 3, wherein said multiplexer forwards the stored signals from said first intermediate storage device to said signal transmitting portion during even-numbered TDMA transmission frames and forwards the stored signals from said second intermediate storage device to said signal transmitting portion during odd-numbered TDMA transmission frames.

5. The private base station according to claim 2, wherein said signal interconnection means further comprises a third intermediate storage device for storing signals of a third communication, said third communication being between a third user located at said private base station and said terminals users in said first and second communications, said third intermediate storage device being connected to a microphone at said private base station for receiving said third communication and to said signal transmitting portion.

6. The private base station according to claim 5, wherein said signal interconnection means further comprises a multiplicity of summation devices for summing said communications, a first summation device connected to said first and third intermediate storage devices, a second summation device connected to said second and third intermediate storage devices, said first and second summation devices being connected to said multiplexer for forwarding summed communications of said first and third communications and said second and third communications to said second and first terminals, respectively, and a third summation device connected to said first and second intermediate storage devices, said third summation device also being connected to a speaker for transmitting said summed first and second communications to said third user at said private base station location.

7. The private base station according to claim 6, wherein said multiplexer forwards the stored signals from said first and third intermediate storage devices to said signal transmitting portion during even-numbered TDMA transmission frames and forwards the stored signals from said second and third intermediate storage devices to said signal transmitting portion during odd-numbered TDMA transmission frames, and wherein said third summation device forwards the stored signals from said first and second intermediate storage devices to said speaker.

8. The private base station according to claim 1, wherein said signal receiving portion comprises:

a receiver for receiving the wireless duplex intercom communications from said at least two terminal users;

a demodulator, connected to said receiver, for filtering said communications;

an equalizer, connected to said demodulator, for adjusting said communications; and a symbol detector, connected to said equalizer, for detecting signals within said communications.

9. The private base station according to claim 8, wherein said interconnection means connects said symbol detector to said signal transmitting means.

10. The private base station according to claim 8, wherein said signal receiving portion further comprises:

a first adder connected to said symbol detector; and a ciphering unit, connected to said adder, for deciphering said signals, said interconnection means connecting said first adder to said signal transmitting means.

11. The private base station according to claim 10, further comprising a private key device connected to said ciphering unit.

12. The private base station according to claim 10, further comprising at least two private key devices connected to said ciphering unit, a first private key being associated with said first communication and a second private key being associated with said second communication.

13. The private base station according to claim 10, wherein said signal receiving portion further comprises:

a deinterleaver, connected to said first adder, for deinterleaving said signals within said communications; and a channel decoder, connected to said deinterleaver, for decoding said signals.

14. The private base station according to claim 13, wherein said interconnection means connects said channel decoder to said signal transmitting means.

15. The private base station according to claim 13, wherein said signal receiving portion further comprises:

a speech decoder, connected to said channel decoder, for decoding speech signals within said communications.

16. The private base station according to claim 15, wherein said interconnection means connects said speech decoder to said signal transmitting means.

17. The private base station according to claim 1, wherein said signal transmitting portion comprises:

a burst generator;

a signal modulator, connected to said burst generator, for modulating said communications;

an amplifier, connected to said signal modulator, for amplifying the signals of said communications; and an antenna, connected to said amplifier, for transmitting said wireless duplex intercom communications to said at least two terminal users.

18. The private base station according to claim 17, wherein said interconnection means connects said signal receiving portion to said burst generator.

19. The private base station according to claim 17, wherein said signal transmitting portion further comprises:

a second adder connected to said burst generator; and a ciphering unit, connected to said adder, for deciphering said duplex intercom communications, said interconnection means connecting said second adder to said signal receiving means.

20. The private base station according to claim 19, further comprising a private key device connected to said ciphering unit.

21. The private base station according to claim 19, further comprising at least two private key devices connected to said ciphering unit, a first private key being associated with said first communication and a second private key being associated with said second communication.

22. The private base station according to claim 19, wherein said signal transmitting portion further comprises:

an interleaver, connected to said second adder, for interleaving signals within said communications; and a channel coder, connected to said interleaver, for coding said signals within said communications.

23. The private base station according to claim 22, wherein said interconnection means connects said signal receiving portion to said channel coder.

24. The private base station according to claim 22, wherein said signal transmitting portion further comprises:

a speech coder, connected to said channel coder, for encoding speech signals with said communications.

25. The private base station according to claim 24, wherein said interconnection means connects said signal receiving portion to said speech coder.

26. The private base station according to claim 1, wherein said signal receiving portion receives said first communication in a first TDMA transmission frame and said signal transmitting portion transmits said first communication to said at least a second of said terminals in a subsequent TDMA transmission frame.

27. The private base station according to claim 26, wherein said signal receiving portion receives said first communication in a first timeslot within said first TDMA transmission frame and said signal transmitting portion transmits said first communication in a second timeslot in said subsequent TDMA transmission frame.

28. The private base station according to claim 27, wherein the positions of said first and second timeslots within said first and said subsequent TDMA transmission frames differ.

29. The private base station according to claim 27, wherein the frequencies of said first communication in said first timeslot and of said first communication in said second timeslot differ.

30. The private base station according to claim 1, wherein said second communication from said second terminal is relayed in duplex mode through said signal receiving and signal transmitting portions of said private base station to said first terminal, said first and said second communications each being at half-rate and on alternative TDMA transmission frames.

31. The private base station according to claim 1, wherein said first and second communications are at half-rate and on respective alternate TDMA transmission frames, said private base station receiving signals from said first user in a first timeslot on even-numbered frames and receiving signals from said second user in said first timeslot on odd-numbered frames.

32. The private base station according to claim 31, wherein the frequencies of said first communication in said first timeslot in said even-numbered frames and of said second communication in said first timeslot in said odd-numbered frames differ.

33. The private base station according to claim 31, wherein said private base station transmits signals from said first user in a second timeslot on said odd-numbered frames and transmits signals from said second user in said second timeslot on said even-numbered frames.

34. The private base station according to claim 33, wherein the frequencies of at least two of said first communication in said first timeslot in said even-numbered frames, of said second communication in said first timeslot in said odd-numbered frames, of said first communication in said second timeslot in said odd-numbered frames, and of said second communication in said second timeslot on said even-numbered frames differ.

35. A method for establishing a duplex intercom communication between at least two users within a private telephone system, said private telephone system including a private base station and a multiplicity of terminals in wireless time division multiple access (TDMA) communication therewith, each of said at least two users operating a respective one of said terminals, said method comprising the steps of:

transmitting, from a first of said terminals to said private base station, a communication request from a first user of said first terminal to a second user of a second terminal, said private base station allocating a first communication channel between said first terminal and said private base station;

transmitting, from said private base station to said second terminal, said communication request, said private base station allocating a second communication channel between said second terminal and said private base station, whereby upon communication establishment said duplex intercom communication between said first and second users of said first and second terminals, respectively, are relayed through said private base station across said first and second communication channels; and receiving, by a third user at a user station at said private base station, said duplex intercom communication between said first and second users.

36. The method according to claim 35, wherein said first terminal transceives signals on said first half-rate communication channel on even-numbered TDMA transmission frames and said second terminal transceives signals on said second half-rate communication channel on odd-numbered TDMA transmission frames.

37. The method according to claim 35, wherein said first and second communication channels are selected by said private base station in accordance with an adaptive channel allocation algorithm.

38. The method according to claim 35, further comprising the step of:

transmitting, by said third user through said private base station, a signal to said first and second users, said first, second and third users having said duplex intercom communication.

39. A private base station within a private telephone system, said private base station being in wireless time division multiple access (TDMA) communication with a multiplicity of terminals also within said private telephone system, users of at least two of said terminals being in remote communication with respective remote parties outside of said private telephone system via said private base station, said private base station comprising:

a signal receiving portion for receiving said wireless communications from said at least two private telephone system terminal users;

wireline communication means, connected to said signal receiving portion, for converting the wireless signals of said TDMA communications from said multiplicity of terminals to corresponding wireline signals, forwarding said converted wireline signals to the respective remote parties and receiving wireline communications from said remote parties to said terminal users over respective half-rate voice channels, and converting the wireline signals of said wireline communications to corresponding TDMA wireless signals;

a multiplicity of intermediate storage devices for storing said wireless communications from said at least two private telephone terminal users, each said intermediate storage device being connected to said signal receiving portion; and a signal transmitting portion, connected to said wireline communication means, for transmitting said corresponding TDMA wireless signals to said terminal users, thereby establishing at least two wireless-wireline links between said terminal users and said remote parties.

40. The private base station according to claim 39, wherein said wireline communication means converts the wireless signals received from a first terminal user during even-numbered TDMA transmission frames and forwards said corresponding converted wireline signals to a first remote party, and converts the wireless signals received from a second terminal user during odd-numbered TDMA transmission frames and forwards said corresponding converted wireline signals from said second user to a second remote party.

41. The private base station according to claim 40, wherein said wireline communication means converts the wireline signals from said first remote party to corresponding first wireless signals and transmits said corresponding first wireless signals to said first terminal user during said even-numbered TDMA transmission frames at a timeslot therein different from that of said wireless signals received from said first terminal user, and converts the wireline signals from said second remote party to corresponding second wireless signals and transmits said corresponding second wireless signals to said second terminal user during said odd-numbered TDMA transmission frames at a timeslot therein different from that of said wireless signals received from said second terminal user.

42. A method for establishing at least two independent duplex remote communications between at least two users within a private telephone system and respective remote parties outside of said private telephone system, such private telephone system including a private base station and a multiplicity of terminals in wireless time division multiple access (TDMA) communication therewith, each of said at least two users operating a respective one of said terminals, said method comprising the steps of:

transmitting, from a first of said terminals to said private base station, a communication request from a first user of said first terminal to a first remote party, said private base station allocating a first half-rate communication channel between said first user and said first remote party, and establishing a first duplex communication therebetween;

transmitting, from a second of said terminals to said private base station, a second communication request from a second user of said second terminal to a second remote party, said private base station allocating a second half-rate communication channel between said second user and said second remote party, and establishing a second duplex communication therebetween, said first and second duplex communications being independent of each other; and storing signals from said first duplex communications and said second duplex communications at said private base station.

43. The method according to claim 42, wherein said first and second communication channels are each half-rate channels, said first and second terminals transceiving signals with said first and second remote parties, respectively, through said private base station on said first and second communication channels, respectively, said first communication channel being on even-numbered TDMA transmission frames and said second communication channel being an odd-numbered TDMA transmission frames.

44. The method according to claim 42, wherein said first and second communication channels are selected by said private base station in accordance with an adaptive channel allocation algorithm.

45. A method for establishing at least two independent duplex remote communications between at least two users within a private telephone system and respective remote parties outside of said private telephone system, such private telephone system including a private base station and a multiplicity of terminals in wireless time division multiple access (TDMA) communication therewith, each of said at least two users operating a respective one of said terminals, said method comprising the steps of:

transmitting, from a first of said terminals to said private base station, a communication request from a first user of said first terminal to a first remote party, said private base station allocating a first half-rate communication channel between said first user and said first remote party, and establishing a first duplex communication therebetween;

transmitting, from said private base station, a communication request from a second remote party to said second terminal, said private base station allocating a second half-rate communication channel between said second user and said second remote party, and establishing a second duplex communication therebetween, said first and second duplex communications being independent of each other; and storing signals from said first duplex communications and said second duplex communications at said private base station.

46. The method according to claim 45, wherein said first and second communication channels are each half-rate channels, said first and second terminals transceiving signals with said first and second remote parties, respectively, through said private base station on said first and second communication channels, respectively, said first communication channel being on even-numbered TDMA transmission frames and said second communication channel being an odd-numbered TDMA transmission frames.

47. The method according to claim 45, wherein said first and second communication channels are selected by said private base station in accordance with an adaptive channel allocation algorithm.

48. A method for establishing at least two independent duplex remote communications between at least two users within a private telephone system and respective remote parties outside of said private telephone system, such private telephone system including a private base station and a multiplicity of terminals in wireless time division multiple access (TDMA) communication therewith, each of said at least two users operating a respective one of said terminals, said method comprising the steps of:

transmitting, from said private base station, a communication request from a first remote party to said first terminal, said private base station allocating a first half-rate communication channel between said first user and said first remote party, and establishing a first duplex communication therebetween;

transmitting, from a second of said terminals to said private base station, a second communication request from a second user of said second terminal to a second remote party, said private base station allocating a second half-rate communication channel between said second user and said second remote party, and establishing a second duplex communication therebetween, said first and second duplex communications being independent of each other; and storing signals from said first duplex communications and said second duplex communications at said private base station.

49. The method according to claim 48, wherein said first and second communication channels are each half-rate channels, said first and second terminals transceiving signals with said first and second remote parties, respectively, through said private base station on said first and second communication channels, respectively, said first communication channel being on even-numbered TDMA transmission frames and said second communication channel being an odd-numbered TDMA transmission frames.

50. The method according to claim 48, wherein said first and second communication channels are selected by said private base station in accordance with an adaptive channel allocation algorithm.

51. A method for establishing at least two independent duplex remote communications between at least two users within a private telephone system and respective remote parties outside of said private telephone system, such private telephone system including a private base station and a multiplicity of terminals in wireless time division multiple access (TDMA) communication therewith, each of said at least two users operating a respective one of said terminals, said method comprising the steps of:

transmitting, from said private base station, a communication request from a first remote party to said first terminal, said private base station allocating a first half-rate communication channel between said first user and said first remote party, and establishing a first duplex communication therebetween;

transmitting, from said private base station, a communication request from a second remote party to said second terminal, said private base station allocating a second half-rate communication channel between said second user and said second remote party, and establishing a second duplex communication therebetween, said first and second duplex communications being independent of each other; and storing signals from said first duplex communications and said second duplex communications at said private base station.

52. The method according to claim 51, wherein said first and second communication channels are each half-rate channels, said first and second terminals transceiving signals with said first and second remote parties, respectively, through said private base station on said first and second communication channels, respectively, said first communication channel being on even-numbered TDMA transmission frames and said second communication channel being an odd-numbered TDMA transmission frames.

53. The method according to claim 51, wherein said first and second communication channels are selected by said private base station in accordance with an adaptive channel allocation algorithm.

* * * * *

UNITED STATES PATENT AND TRADEMARK OFFICE
CERTIFICATE OF CORRECTION

PATENT NO. : 6,044,268　　　　　　　　　　　　　　　　Page 1 of 1
DATED　　　 : March 28, 2000
INVENTOR(S) : Haartsen It is certified that error appears in the above-identified patent and that said Letters Patent is hereby corrected as shown below:

Column 1, line 50　　　　　After "system" insert --10--

Column 7, line 34　　　　　Replace "283" with --28B--

Signed and Sealed this

Fifth Day of June, 2001

Attest:

NICHOLAS P. GODICI

*Attesting Officer*　　　　*Acting Director of the United States Patent and Trademark Office*